United States Patent
Park et al.

(10) Patent No.: US 11,108,509 B2
(45) Date of Patent: Aug. 31, 2021

(54) METHODS FOR TRANSMITTING AND RECEIVING ACKNOWLEDGMENT INFORMATION BETWEEN TERMINAL AND BASE STATION IN WIRELESS COMMUNICATION SYSTEM, AND DEVICES FOR SUPPORTING SAME

(71) Applicant: LG Electronics Inc., Seoul (KR)

(72) Inventors: Hanjun Park, Seoul (KR); Suckchel Yang, Seoul (KR); Seonwook Kim, Seoul (KR); Joonkui Ahn, Seoul (KR); Seunggye Hwang, Seoul (KR); Jaehyung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 63 days.

(21) Appl. No.: 16/621,838

(22) PCT Filed: Jun. 15, 2018

(86) PCT No.: PCT/KR2018/006771
§ 371 (c)(1),
(2) Date: Dec. 12, 2019

(87) PCT Pub. No.: WO2018/230996
PCT Pub. Date: Dec. 20, 2018

(65) Prior Publication Data
US 2021/0143945 A1 May 13, 2021

Related U.S. Application Data

(60) Provisional application No. 62/543,958, filed on Aug. 10, 2017, provisional application No. 62/520,517, filed on Jun. 15, 2017.

(51) Int. Cl.
*H04L 1/18* (2006.01)

(52) U.S. Cl.
CPC .................. *H04L 1/1896* (2013.01)

(58) Field of Classification Search
None
See application file for complete search history.

(56) References Cited

U.S. PATENT DOCUMENTS

2013/0294357 A1  11/2013  Shimanuki et al.
2017/0142593 A1   5/2017  Seo et al.
(Continued)

FOREIGN PATENT DOCUMENTS

EP   3471308   4/2019

OTHER PUBLICATIONS

EP Extended European Search Report in European Appln. No. 18816832.2, dated Feb. 2, 2021, 14 pages.
Huawei, HiSilicon, "Discussion on CBG-based feedback," R1-1706964, 3GPP TSG RAN WG1 Meeting #89, Hangzhou, China, dated May 15-19, 2017, 4 pages.
(Continued)

*Primary Examiner* — Hong S Cho
(74) *Attorney, Agent, or Firm* — Fish & Richardson P.C.

(57) ABSTRACT

Disclosed are a method whereby a terminal transmits acknowledgement information to a base station in a wireless communication system, and a device therefor, characterized by: receiving N pieces of downlink data (N is a natural number), wherein one piece of downlink data comprises M transmission blocks (TBs) (M is a natural number), and one TB comprises L code block groups (CBGs) (L is a natural number); bundling acknowledge information on the total number N*M*L of CBGs, comprised in the N pieces of downlink data, into an X-bit size (X is a natural number greater than or equal to 1 and less than N*M*L) on the basis of a predetermined rule; and transmitting the bundled acknowledgement information in the X-bit size to the base station.

12 Claims, 17 Drawing Sheets

(56) References Cited

U.S. PATENT DOCUMENTS

2020/0235759 A1* 7/2020 Ye .................. H03M 13/116
2020/0374043 A1* 11/2020 Lei .................. H04W 72/0413

OTHER PUBLICATIONS

Huawei, HiSilicon, "On HARQ-ACK bundling in NR," R1-1706981, 3GPP TSG RAN WG1 Meeting #89, Hangzhou, China, dated May 15-19, 2017, 2 pages.
NTT DOCOMO, Inc., "HARQ-ACK feedback mechanisms," R1-1708481, 3GPP TSG RAN WG1 Meeting #89, Hangzhou, P.R. China, dated May 15-19, 2017, 3 pages.
Sequans Communications, "On support of joint UCI feedback in NR CA," R1-1700643, 3GPP TSG RAN WG1 Meeting—NR, Spokane, US, dated Jan. 16-20, 2017, 4 pages.
PCT International Search Report and Written Opinion in International Application No. PCT/KR2018/006771, dated Oct. 1, 2018, 20 pages (with English translation).
Huawei, HiSilicon, "Multiplexing of multiple HARQ-ACK feedback," R1-1708151, 3GPP TSG RAN WG1 Meeting #89, Hangzhou, China, dated May 15-19, 2017, 3 pages.
Lenovo, Motorola Mobility, "Discussion on enhanced HARQ feedback and CBG-based partial retransmission," R1-1705653, 3GPP TSG RAN WG1 Meeting #88bis, Spokane, USA, dated Apr. 3-7, 2017, 5 pages.
LG Electronics, "Consideration on CB group based HARQ-ACK feedback," R1-1707662, 3GPP TSG RAN WG1 Meeting #89, Hangzhou, P.R. China, dated May 15-19, 2017, 5 pages.

* cited by examiner

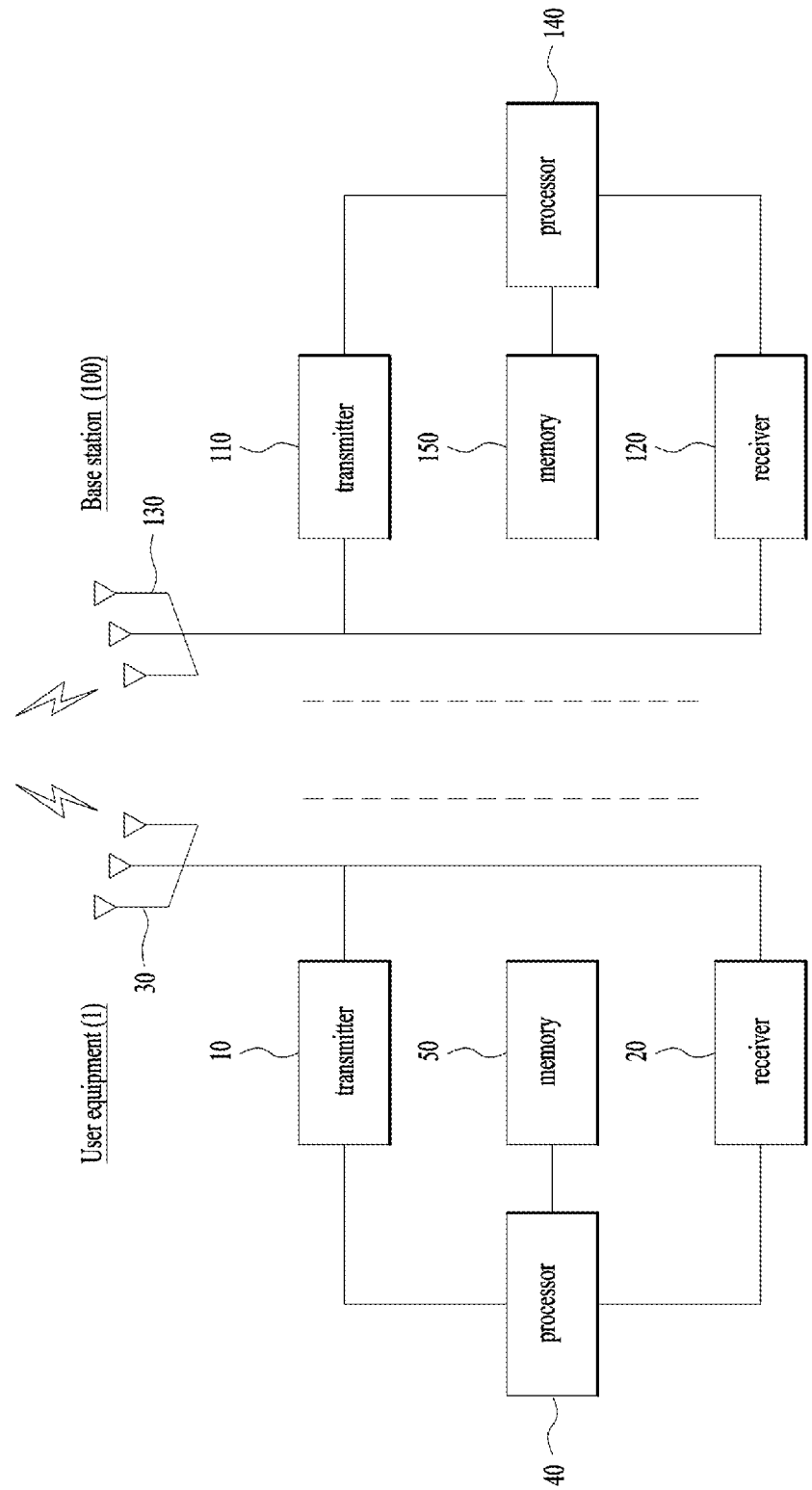

METHODS FOR TRANSMITTING AND RECEIVING ACKNOWLEDGMENT INFORMATION BETWEEN TERMINAL AND BASE STATION IN WIRELESS COMMUNICATION SYSTEM, AND DEVICES FOR SUPPORTING SAME

CROSS-REFERENCE TO RELATED APPLICATIONS

This application is a National Stage application under 35 U.S.C. § 371 of International Application No. PCT/KR2018/006771, filed on Jun. 15, 2018, which claims the benefit of U.S. Provisional Application No. 62/543,958, filed on Aug. 10, 2017 and U.S. Provisional Application No. 62/520,517, filed on Jun. 15, 2017. The disclosures of the prior applications are incorporated by reference in their entirety.

TECHNICAL FIELD

The present disclosure relates to a wireless communication system, and more particularly, to methods for transmitting and receiving acknowledgement information between a terminal and a base station in a wireless communication system and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

The object of the present disclosure is to provide methods of transmitting and receiving acknowledgement information between a terminal (user equipment) and a base station in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides methods of transmitting and receiving acknowledgement information between a user equipment (UE) and a base station in a wireless communication system and devices for supporting the same In an aspect of the present disclosure, provided herein is a method of transmitting, by a UE, acknowledgement information to a base station in a wireless communication system. The method may include: receiving N pieces of downlink data (where N is a natural number), wherein one piece of downlink data includes M transmission blocks (TBs) (where M is a natural number) and one TB includes L code block groups (CBGs) (where L is a natural number); bundling acknowledgement information for a total of N*M*L CBGs included in the N pieces of downlink data into X-bit acknowledgement information (where X is a natural number more than or equal to 1 and less than N*M*L) based on a predetermined rule; and transmitting the bundled X-bit acknowledgement information to the base station.

For example, the predetermined rule may correspond to a first rule where acknowledgement information for all CBGs included in a same TB is bundled. In this case, X may correspond to N*M.

As another example, the predetermined rule may correspond to a second rule where acknowledgement information for all CBGs having a same CBG index for each TB and included in same downlink data is bundled. In this case, X may correspond to N*L.

As still another example, the predetermined rule may correspond to a third rule where acknowledgement information for all CBGs having a same CBG index for each TB and included in TBs with a same TB index for each piece of downlink data is bundled. In this case, X may correspond to M*L.

As yet another example, the predetermined rule may correspond to a fourth rule where acknowledgement information for all CBGs included in same downlink data is bundled. In this case, X may correspond to N.

As a further example, the predetermined rule may correspond to a fifth rule where acknowledgement information for all CBGs included in a same TB is bundled as first acknowledgement information and the first acknowledgement information for all TBs with a same TB index for each piece of downlink data is bundled as second acknowledgement information. In this case, X may correspond to M.

As a still further example, the predetermined rule may correspond to a sixth rule where acknowledgement information for all CBGs with a same CBG index for all TBs included in the N pieces of downlink data is bundled. In this case, and X may correspond to L.

As an even further example, the predetermined rule may correspond to a seventh rule where the acknowledgement information for the N*M*L CBGs is bundled. In this case, X may correspond to 1.

As a yet further example, the predetermined rule may correspond to an eighth rule where although the acknowledgement information for the N*M*L CBGs is gradually bundled, the bundling is stopped if a size of acknowledgement information bundled until step Y (Y is a natural number) is less than or equal to a specific bit size.

In another aspect of the present disclosure, provided herein is a method of receiving, by a base station, acknowledgement information from a UE in a wireless communication system. The method may include: transmitting N pieces of downlink data (where N is a natural number) to the UE, wherein one piece of downlink data includes M TBs (where M is a natural number) and one TB includes L CBGs (where L is a natural number); and receiving, from the UE, X-bit acknowledgement information (where X is a natural number more than or equal to 1 and less than N*M*L), wherein the X-bit acknowledgement information is obtained by bundling acknowledgement information for a total of N*M*L CBGs included in the N pieces of downlink data based on a predetermined rule.

In a further aspect of the present disclosure, provided herein is a UE for transmitting acknowledgment information to a base station in a wireless communication system. The UE may include: a receiver; a transmitter; and a processor connected to the receiver and the transmitter. The processor may be configured to: receive N pieces of downlink data (where N is a natural number), wherein one piece of downlink data includes M TBs (where M is a natural number) and one TB includes L CBGs (where L is a natural number); bundle acknowledgement information for a total of N*M*L CBGs included in the N pieces of downlink data into X-bit acknowledgement information (where X is a natural number more than or equal to 1 and less than N*M*L) based on a predetermined rule; and transmit the bundled X-bit acknowledgement information to the base station.

In a still further aspect of the present disclosure, provided herein is a base station for receiving acknowledgement information from a UE in a wireless communication system. The base station may include: a receiver; a transmitter; and a processor connected to the receiver and the transmitter. The processor may be configured to: transmit N pieces of downlink data (where N is a natural number) to the UE, wherein one piece of downlink data includes M TBs (where M is a natural number) and one TB includes L CBGs (where L is a natural number); and receive, from the UE, X-bit acknowledgement information (where X is a natural number more than or equal to 1 and less than N*M*L), wherein the X-bit acknowledgement information is obtained by bundling acknowledgement information for a total of N*M*L CBGs included in the N pieces of downlink data based on a predetermined rule.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, when a UE intends to transmit CBG-level acknowledgement information to a base station, the UE can bundle the acknowledgement information as needed and then transmit the bundled acknowledgement information to the base station.

Accordingly, the UE can transmit, to the base station, acknowledgment information with a suitable bit size depending on situations.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 24 is a block diagram of a UE and a base station (BS) for implementing the proposed embodiments.

MODE FOR CARRYING OUT THE PRESENT DISCLOSURE

Figure 1:
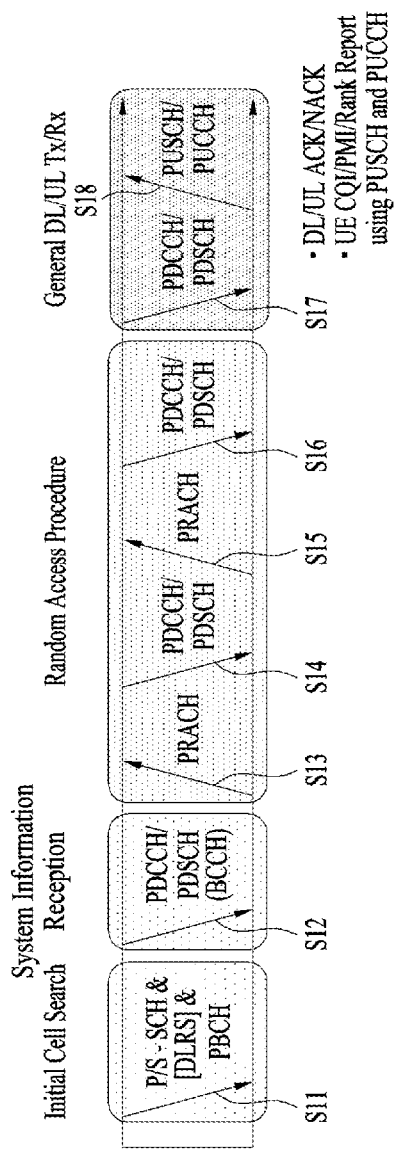
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While embodiments of the present disclosure are described in the context of a 3GPP NR system as well as a 3GPP LTE/LTE-A system in order to clarify the technical features of the present disclosure, the present disclosure is also applicable to an IEEE 802.16e/m system, and so on.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
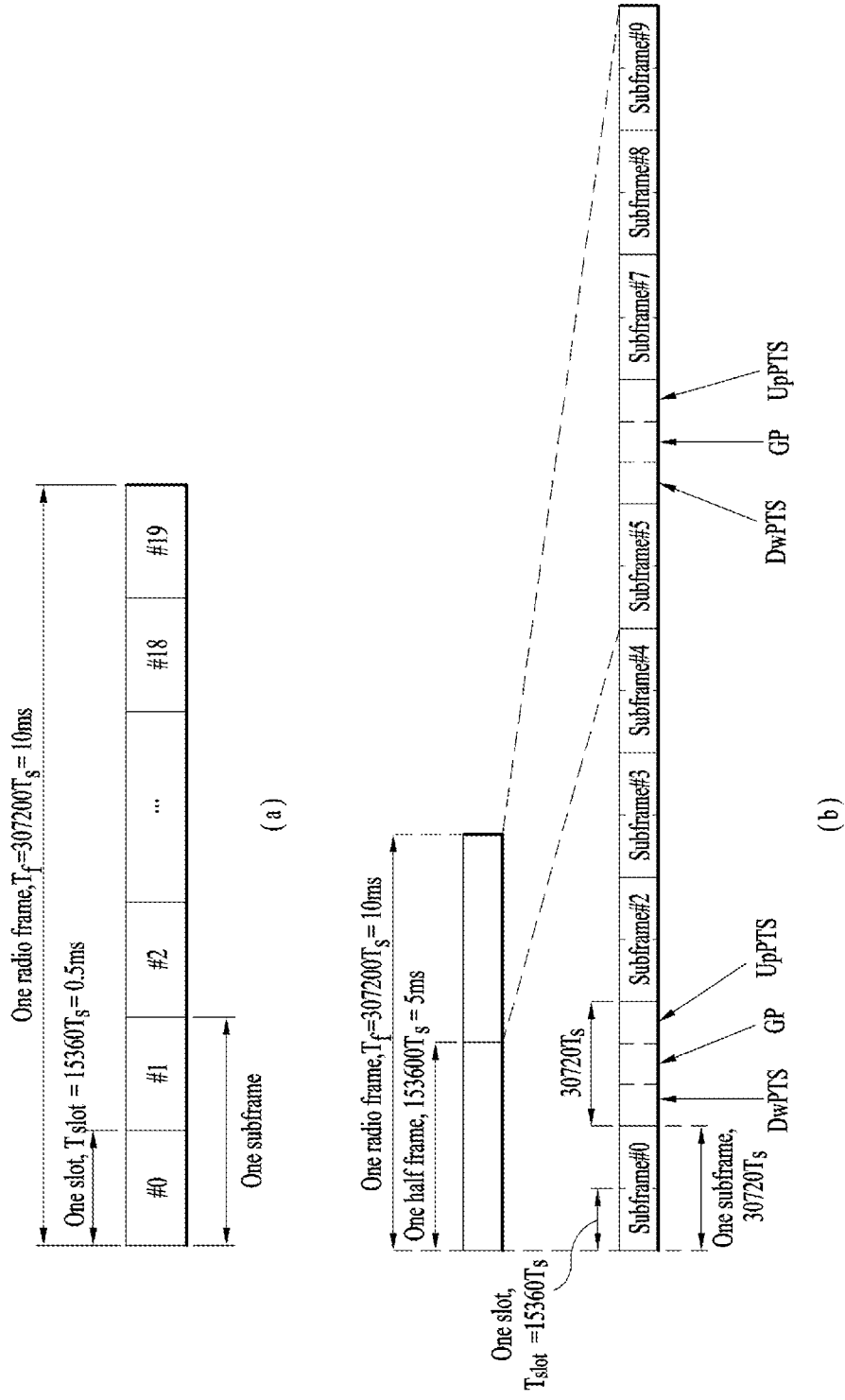
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
| | | UpPTS | | | UpPTS | |
| Special | | Normal | Extended | | | |
| subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |

TABLE 1-continued

| | | Normal cyclic prefix in downlink | | | | |
| | | UpPTS | | Extended cyclic prefix in downlink | | |
| Special | | Normal | Extended | | UpPTS | |
| subframe configuration | DwPTS | cyclic prefix in uplink | cyclic prefix in uplink | DwPTS | Normal cyclic prefix in uplink | Extended cyclic prefix in uplink |
|---|---|---|---|---|---|---|
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| | | Normal cyclic prefix in downlink | | | | |
| | | UpPTS | | Extended cyclic prefix in downlink | | |
| Special | | Normal | Extended | | UpPTS | |
| subframe configuration | DwPTS | cyclic prefix in uplink | cyclic prefix in uplink | DwPTS | Normal cyclic prefix in uplink | Extended cyclic prefix in uplink |
|---|---|---|---|---|---|---|
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
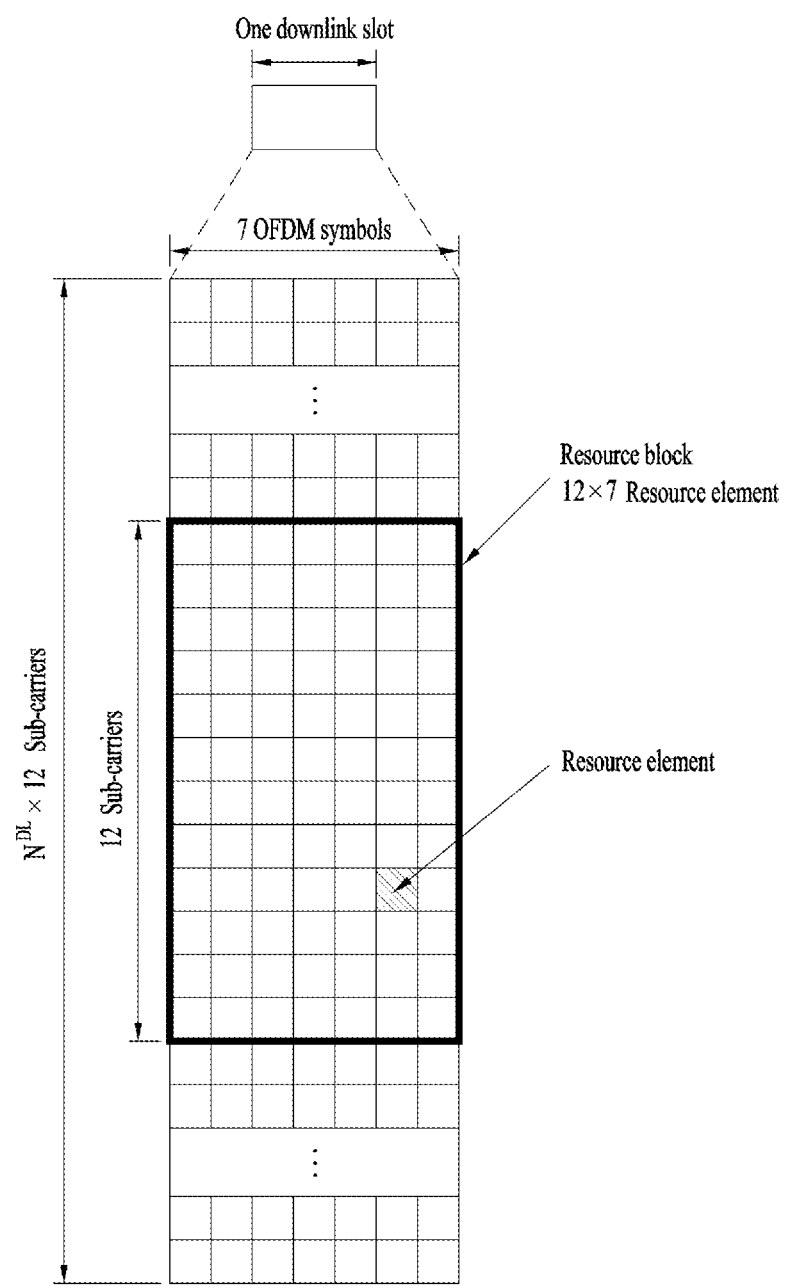
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
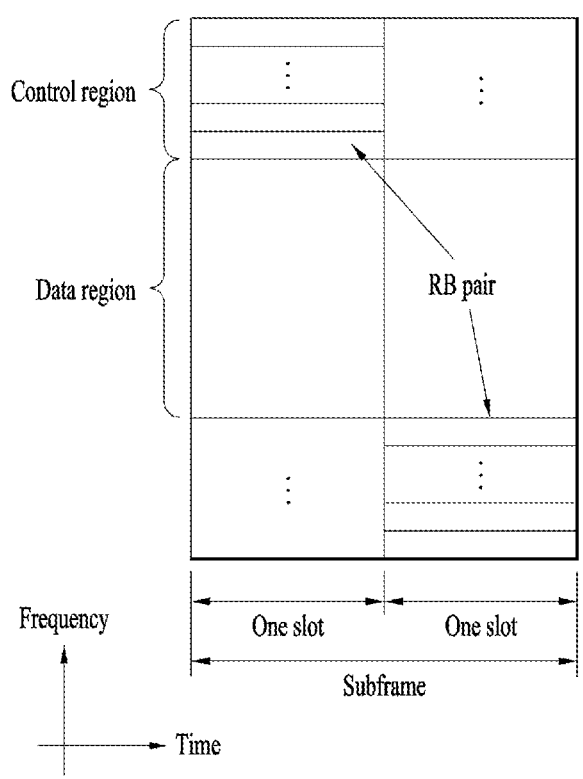
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
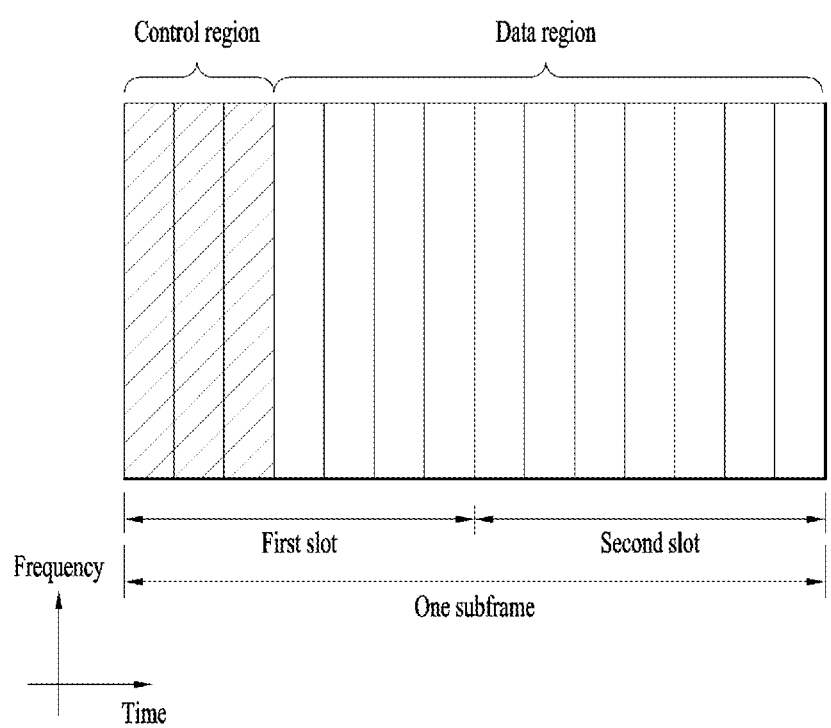
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering a HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, a UE is defined to report channel state information (CSI) to a BS (or eNB). Herein, the CSI collectively refers to information indicating the quality of a radio channel (link) established between a UE and an antenna port.

For example, the CSI may include a rank indicator (RI), a precoding matrix indicator (PMI), and a channel quality indicator (CQI).

The RI corresponds to rank information about a channel and represents the number of streams that a UE receives on the same time-frequency resources. The value of the RI is determined according to long-term fading of the channel, and thus the RI is usually fed back to the eNB by the UE with a longer period than that for the PMI and CQI.

The PMI is a value reflecting channel space characteristics and indicates a precoding index preferred by the UE based on a metric such as a signal-to-interference-plus-noise ratio (SINR).

The CQI is a value indicating the intensity of a channel and typically indicates a reception SINR which may be obtained by the eNB when the PMI is used.

In the 3GPP LTE or LTE-A system, the eNB configures a plurality of CSI processes for the UE and receives CSI for each process from the UE. In this case, the CSI process is configured with a CSI-RS for measuring the quality of a signal from the eNB and a CSI interference measurement (CSI-IM) resource.

1.4. RRM Measurement

The LTE system supports radio resource management (RRM) operation including power control, scheduling, cell search, cell reselection, handover, radio link or connection monitoring, and connection establishment and re-establishment. In this case, the serving cell may request the UE to send RRM measurement information corresponding to the measurement value for performing the RRM operation. As representative examples, in the LTE system, the UE may measure cell search information, reference signal received power (RSRP), reference signal received quality (RSRQ), and the like for each cell and then transmit the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI are defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio NxRSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, the UE operating in the LTE system may measure the RSRP in the bandwidth indicated by the allowed measurement bandwidth related information element (IE) transmitted in system information block type 3 (SIB3). Meanwhile, in the case of inter-frequency measurement, the UE may measure the RSRP in the bandwidth corresponding to one of 6, 15, 25, 50, 75, 100 resource blocks (RBs) indicated by the allowed measurement bandwidth related IE transmitted in SIB5. Alternatively, when there is no IE, the UE may measure the RSRP in the entire downlink system frequency band as the default operation.

Upon receiving information on the allowed measurement bandwidth, the UE may consider the corresponding value as the maximum measurement bandwidth and then freely measure the RSRP value in the corresponding value. However, if the service cell transmits an IE defined as WB-RSRQ to the UE and set the allowed measurement bandwidth equal to or higher than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of p and cyclic prefix information per carrier bandwidth part can be signaled in DL and UL, respectively. For example, the value of p and cyclic prefix information per downlink carrier bandwidth part may be signaled though DL-BWP-mu and DL-MWP-cp corresponding to higher layer signaling. As another example, the value of p and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure can be applied, a self-contained slot structure can be applied based on the above-described slot structure.

Figure 6:
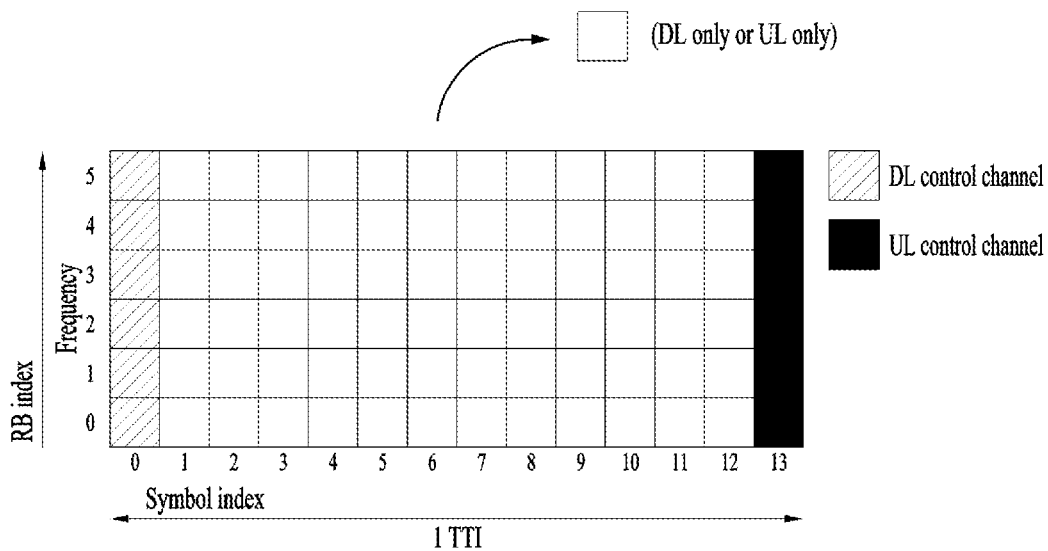
FIG. 6 is a diagram illustrating a self-contained subframe structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE may sequentially perform DL transmission and UL transmission in one slot. That is, the eNB and UE may transmit and receive not only DL data but also a UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
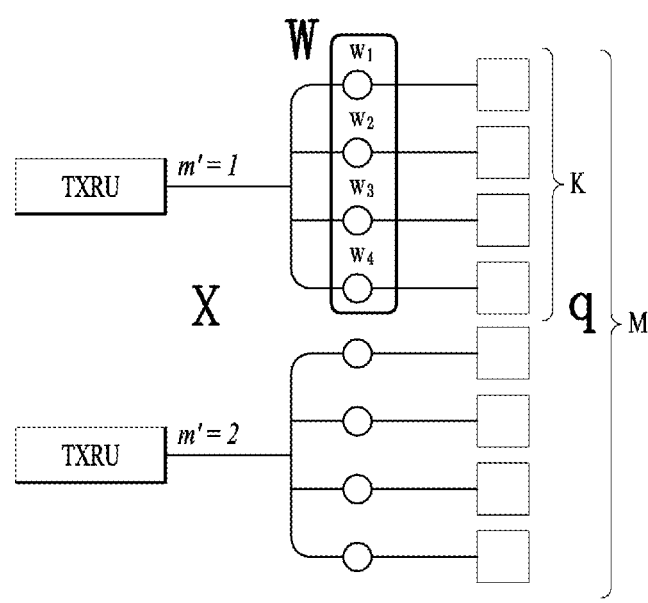
FIGS. 7 and 8 are diagrams illustrating representative connection methods for connecting TXRUs to antenna elements.
Figure 8:
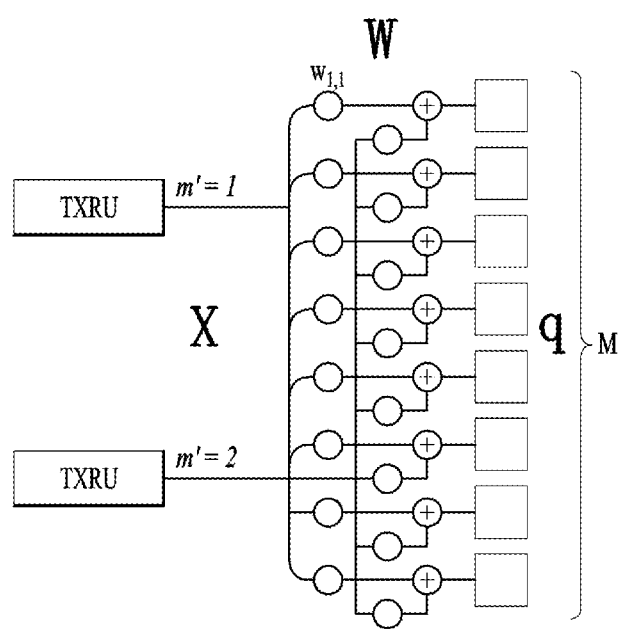

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
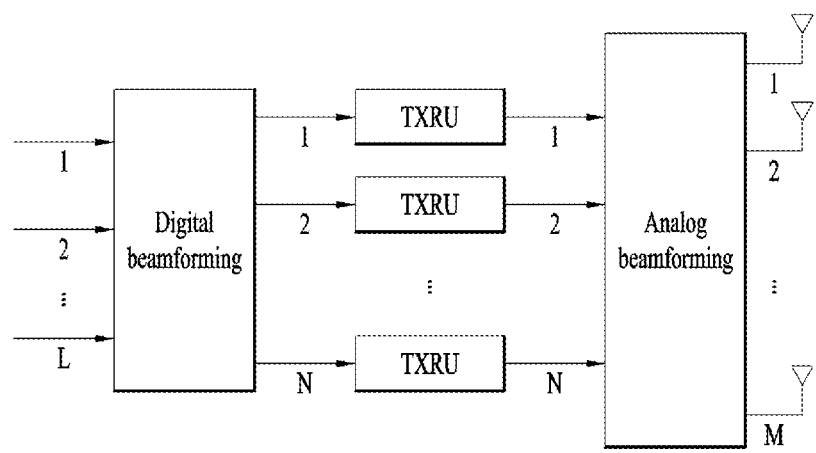
FIG. 9 is a schematic diagram illustrating a hybrid beamforming structure according to an embodiment of the present disclosure from the perspective of TXRUs and physical antennas.

FIG. 9 is a schematic diagram illustrating a hybrid beamforming structure according to an embodiment of the present disclosure from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming can be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
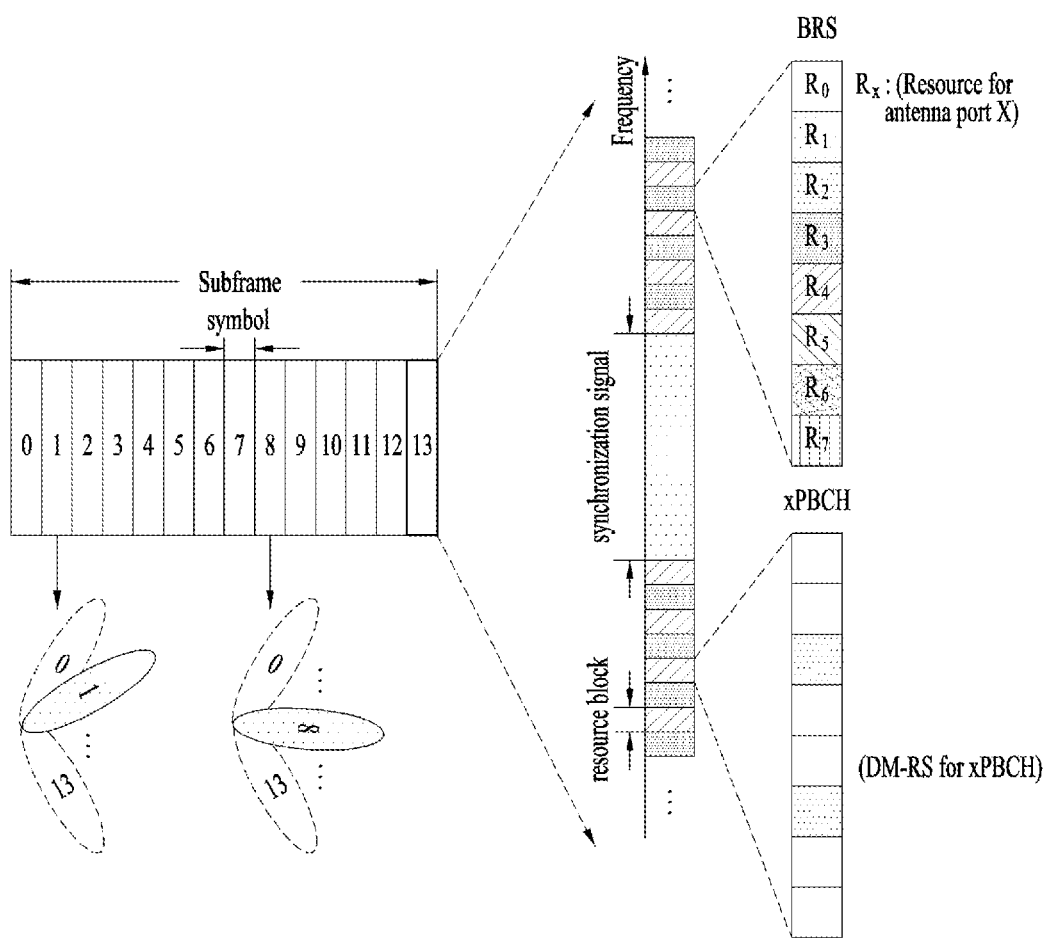
FIG. 10 is a diagram schematically illustrating the beam sweeping operation for synchronization signals and system information during a downlink (DL) transmission process according to an embodiment of the present disclosure.

FIG. 10 is a diagram schematically illustrating the beam sweeping operation for synchronization signals and system information during a downlink (DL) transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Proposed Embodiments

Hereinafter, the configurations according to the present disclosure will be described in detail based on the above-described technical features.

The present disclosure describes in detail a method by which, when a BS transmits (DL) data composed of multiple code block groups (CBGs) in a slot which is a basic scheduling unit and a UE determines an ACK/NACK related to the success or failure of data decoding on a CBG basis in a wireless communication system, the UE combines multiple ACK/NACK bits corresponding to multiple (received) PDSCHs (transport blocks (TBs) or CBGs) using a logical operation (e.g., logical AND operation) and transmits the combined multiple ACK/NACK bits (i.e., ACK/NACK bundling).

In the LTE TDD system, a UE may transmit multiple ACK/NACK bits (per TB) corresponding to PDSCHs received in multiple DL subframes (SFs) on a single PUCCH resource in a single UL SF according to the UL/DL configuration. In this case, the total number ($X_1$) of bits corresponding to the multiple ACK/NACK bits (per TB) may be greater than the maximum UCI payload size ($X_2$) supported on the PUCCH resource (i.e., $X_1 > X_2$). In this case, the UE may obtain compressed ACK/NACK information by applying the logical AND operation to the multiple ACK/NACK bits (per TB) and then transmit the ACK/NACK information on the PUCCH resource.

Meanwhile, compared to the legacy LTE system where a UE transmits an ACK/NACK for each TB, a CBG may be configured for multiple CBs consisting of a TB so that a UE may transmit an ACK/NACK for each CBG in the NR system to which the present disclosure is applicable.

To support various services, flexibility has been considered as an important design issue in the NR system to which the present disclosure is applicable. I If a slot is defined as the scheduling unit, the NR system may support a structure capable of dynamically changing a random slot to a PDSCH transmission slot (DL slot) (a PDSCH means a physical channel for carrying DL data) or a PUSCH transmission slot (UL slot) (a PUSCH means a physical channel for carrying UL data) (i.e., dynamic DL/UL configuration).

When the NR system to which the present disclosure is applicable supports the dynamic DL/UL configuration, if the latency required for HARQ-ACK transmission is not significant, combining HARQ-ACKs for multiple DL slots and transmitting the combined HARQ-ACKs on one PUCCH resource (over a physical channel for carrying UL control information such as HARQ-ACK and/or channel state information (CSI)) is more desirable than transmitting a HARQ-ACK for each DL slot on each PUCCH resource in terms of UL control overhead reduction.

Figure 11:
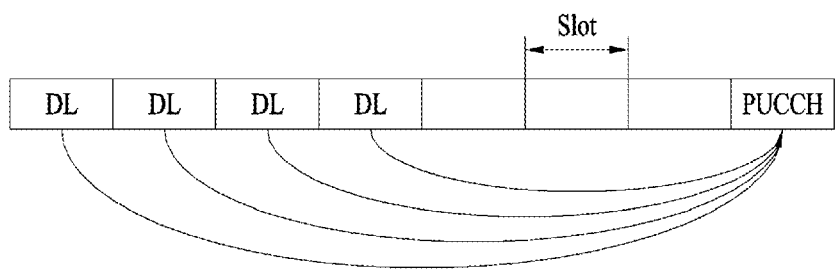
FIG. 11 is a diagram schematically illustrating an ACK/NACK bundling operation according to the present disclosure.

FIG. 11 is a diagram schematically illustrating an ACK/NACK bundling operation according to the present disclosure.

Referring to FIG. 11, a UE may combine multiple HARQ-ACKs for multiple DL slots and transmit the combined multiple HARQ-ACKs on a single PUCCH resource.

Hereinafter, an ACK/NACK information transmission and reception method between a BS and a UE in the NR system to which the present disclosure is applicable will be described in detail.

3.1. ACK/NACK Transmission and Reception Method 1

A UE may perform ACK/NACK bundling on multiple ACK/NACK bits (per CBG) corresponding to multiple PDSCHs (TBs or CBGs) according to one of the following methods and then transmit the multiple ACK/NACK bits on a PUCCH resource.

(1) Option 1: The ACK/NACK bundling (e.g., logical AND operation) is performed on ACK/NACK bits (per CBG) corresponding to a corresponding TB (or slot) for each TB (or slot).

The total ACK/NACK payload size after the ACK/NACK bundling may be equivalent to the total number of TBs (or slots) (where ACK/NACK transmission is required).

In this case, the PUCCH resource may be allocated as follows.

Option 1-1: A PUCCH resource is allocated for each TB (or slot).

Option 1-2: A single PUCCH resource is allocated for all TBs (or slots) (where the ACK/NACK transmission is required).

(2) Option 2: The ACK/NACK bundling (e.g., logical AND operation) is performed on ACK/NACK bits (per CBG) corresponding to the same CBG index for each CBG index.

The total ACK/NACK payload size after the ACK/NACK bundling may be equivalent to the total number of CBGs (where ACK/NACK transmission is required).

In this case, the PUCCH resource may be allocated as follows.

Option 2-1: A PUCCH resource is allocated for each CBG index.

Option 2-2: A single PUCCH resource is allocated for all CBGs (where the ACK/NACK transmission is required).

(3) Option 3: The ACK/NACK bundling (e.g., logical AND operation) is performed on all ACK/NACK bits (per CBG).

The total ACK/NACK payload size after the ACK/NACK bundling may be equivalent to 1 bit.

In this case, the PUCCH resource may be allocated as follows.

Option 3-1: A single PUCCH resource is allocated.

(4) Option 4: (consecutive) ACK counter values are calculated for all ACK/NACK bits (per CBG).

The (consecutive) ACK counter means the number of consecutive ACKs.

The total ACK/NACK payload size after the ACK/NACK bundling may be equivalent to bits.

In this case, the PUCCH resource may be allocated as follows.

Option 4-1: A single PUCCH resource is allocated (for transmitting the 2-bit ACK counter).

If the UE is capable of supporting both option 1 and option 2, the UE may determine which option is used for the ACK/NACK bundling. Thereafter, the UE may report to a BS (1-bit) information indicating which one of options 1 and 2 is used using an additional bit (in the PUCCH resource). Alternatively, the UE may inform the BS of the option used by the UE by applying different cyclic redundancy check (CRC) masks to CRC bits to be applied to UCI depending on either option 1 or option 2 is selected.

When the ACK/NACK bundling is performed, if a CBG-based retransmission PDSCH is included, the UE may consider (as ACK/NACK bundling targets) ACK/NACK bits (per CBG) for scheduled CBGs or ACK/NACK bits (per CBG) for all CBGs configured in the corresponding PDSCH.

Figure 12:
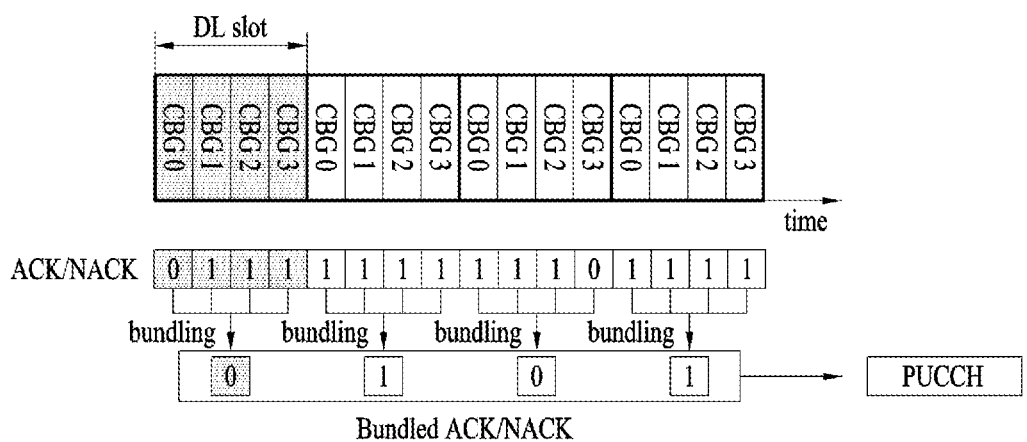
FIG. 12 is a diagram schematically illustrating an ACK/NACK bundling method according to an embodiment of the present disclosure.

FIG. 12 is a diagram schematically illustrating an ACK/NACK bundling method according to an embodiment of the present disclosure.

For example, it is assumed that the (maximum) number of CBGs that can be transmitted in one DL slot is M and a UE performs ACK/NACK bundling on multiple ACK/NACK bits (per CBG) corresponding to N DL slots (or PDSCHs).

In this case, as shown in FIG. 12, the UE may compress M ACK/NACK bits (per CBG) for each DL slot (or TB) into 1 bit using the logical AND operation to perform the ACK/NACK bundling (i.e., ACK/NACK bundling per slot (or TB)). By doing so, N-bit ACK/NACK information may be generated for a total of N DL slots (or TBs). That is, the UE may transmit the N-bit ACK/NACK information on an allocated PUCCH resource. In this case, the UE may be allocated a single PUCCH resource or an (independent) PUCCH resource per DL slot (or TB).

Figure 13:
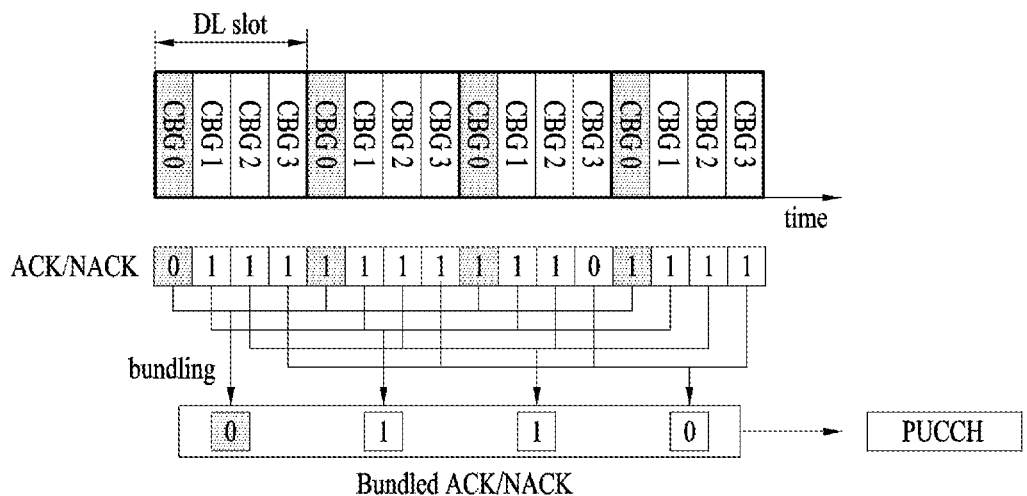
FIG. 13 is a diagram schematically illustrating an ACK/NACK bundling method according to another embodiment of the present disclosure.

FIG. 13 is a diagram schematically illustrating an ACK/NACK bundling method according to another embodiment of the present disclosure.

As a method of performing ACK/NACK bundling on multiple ACK/NACK bits (per CBG) corresponding to N DL slots (or PDSCHs), it may be considered that a UE performs ACK/NACK bundling per CBG index. When the (maximum) number of CBGs that can be transmitted in one DL slot is set to M, CBG indices (in the DL slot) may be defined as follows: 0, 1, . . . , and M−1.

In this case, as shown in FIG. 13, the UE may select ACK/NACK bits (per CBG) having the same CBG index from among the multiple ACK/NACK bits (per CBG) and compress the selected ACK/NACK bits into 1 bit using the logical AND operation to perform the ACK/NACK bundling (i.e., ACK/NACK bundling per CBG index). By doing so, M-bit ACK/NACK information may be generated for a total of N DL slots (or TBs). That is, the UE may transmit the M-bit ACK/NACK information on an allocated PUCCH resource. In this case, the UE may be allocated a single PUCCH resource or an (independent) PUCCH resource per DL slot (or TB).

Additionally, a UE may need to significantly reduce the ACK/NACK payload size transmitted on each carrier due to data scheduling on multiple carriers (i.e., when the UE is scheduled with the multiple carriers). In this case, the UE may compress multiple ACK/NACK bits (per CBG) corresponding to multiple PDSCHs (TBs or CBGs) (where ACK/NACK transmission is required) into 1 bit by applying the logical AND operation thereto. The UE may transmit the 1-bit ACK/NACK information on a single (allocated) PUCCH resource.

As a modified type of ACK/NACK bundling, a UE may report information on the number of consecutive ACKs for multiple ACK/NACK bits (per CBG) corresponding to N DL slots (or PDSCHs) using a PUCCH resource. For example, assuming that N is 4 and the (maximum) number of CBGs that can be transmitted in one DL slot, M is 4, the UE may represent a case in which the number of consecutive ACKs is 1, 2, . . . , or 16 using a 4-bit (consecutive) ACK counter and then report the case to a BS using the PUCCH resource instead of reporting 16 ACK/NACK bits (per CBG).

Further, when a UE attempts to compress multiple ACK/NACK bits (per CBG) corresponding to multiple PDSCHs (TBs or CBGs), the UE may sort the entire PDSCHs (TBs or CBGs) into N subsets and configure ACK/NACK information using states representing M subsets (where M<N), each corresponding to an NACK, and a state(s) representing All NACKs. Since M<N, the UE may use a combinatorial index method. By doing so, the UCI payload size of the ACK/NACK information may be significantly reduced.

ACK/NACK transmission and reception method 1 may be applied together with other proposed methods of the present disclosure unless they collide with each other.

3.2. ACK/NACK Transmission and Reception Method 2

When a UE performs ACK/NACK bundling on multiple ACK/NACK bits (per CBG) corresponding to multiple PDSCH (TBs or CBGs), the UE may perform gradual ACK/NACK bundling as follows depending on the (transmittable) ACK/NACK payload size.

Specifically, for N data transmission units among all data transmission units, the UE may perform the ACK/NACK bundling on ACK/NACK bits (per CBG) corresponding to each data transmission unit. In this case, the data transmission unit may be one of the following.

(1) CBG subset
(2) TB (PDSCH or DL slot)
(3) TB (PDSCH or DL slot) group
(4) Carrier The value of N may be determined by the (transmittable) ACK/NACK payload size.

For example, it is assumed that the (maximum) number of CBGs in one DL slot is set to 4 and a UE transmits ACK/NACK bits (per CBG) for a total of 8 DL slots using a single PUCCH resource. In this case, there may be a total of 4*8=32 ACK/NACK bits (per CBG). In addition, assuming that the ACK/NACK payload size that the UE can transmit on the PUCCH resource is 30 bits, the UE may transmit ACK/NACK information by performing ACK/NACK bundling on CBGs in one of the 8 DL slots without performing the ACK/NACK bundling on multiple CBGs in each DL slot. According to this ACK/NACK bundling method, the size of the ACK/NACK information transmitted by the UE (i.e., 4*7+1=29 bits) may be less than the ACK/NACK payload size that can be transmitted on the PUCCH resource, i.e., 30 bits.

As another example, assuming that the ACK/NACK payload size that can be transmitted on the PUCCH resource is 20 bits, the UE may generate 20-bit ACK/NACK information (4*4+4=20 bits) by performing the ACK/NACK bundling on multiple CBGs in each DL slot for four DL slots among the 8 DL slots so that the UE may satisfy the ACK/NACK payload size that can be transmitted on the PUCCH resource, i.e., 20 bits.

Compared to ACK/NACK transmission and reception method 1, ACK/NACK transmission and reception method 2 is disadvantageous in that the resolution of an ACK/NACK for a specific DL slot (or TB) or a data transmission unit is reduced. However, ACK/NACK transmission and reception method 2 is advantageous in that the total ACK/NACK payload size can be adjusted with high granularity.

ACK/NACK transmission and reception method 2 may be applied together with other proposed methods of the present disclosure unless they collide with each other.

3.3. ACK/NACK Transmission and Reception Method 3

A UE may perform ACK/NACK bundling on multiple ACK/NACK bits (per CBG) corresponding to multiple PDSCHs (TBs or CBGs) on multiple carriers as follows. Thereafter, the UE may transmit ACK/NACK information on a PUCCH resource.

The UE may perform the ACK/NACK bundling for each carrier according to the ACK/NACK bundling method of ACK/NACK transmission and reception method 1. In this case, bundled ACK/NACK bits per carrier may be multiplexed on the multiple carriers (in terms of ACK/NACK payload configuration) and then transmitted on a single PUCCH resource (i.e., bundled A/N multiplexing across multiple carriers).

For example, if a UE performs ACK/NACK bundling on multiple ACK/NACK bits (per CBG) corresponding to multiple PDSCHs (TBs or CBGs) received on multiple carriers, the UE may perform the ACK/NACK bundling for each carrier according to ACK/NACK transmission and reception method 1, multiplex bundled ACKs/NACKs for multiple carriers (in terms of ACK/NACK payload configuration), and then transmit the bundled ACKs/NACKs on a single PUCCH resource.

ACK/NACK transmission and reception method 3 may be applied together with other proposed methods of the present disclosure unless they collide with each other.

Hereinafter, a description will be given of ACK/NACK bundling methods and ACK/NACK transmission and reception methods based thereon when PDSCHs that require ACK/NACK transmission are configured on a specific PUCCH transmission resource and a UE is capable of performing ACK/NACK bundling on ACK/NACK bits (per TB or CBG) for a specific PDSCH among the PDSCHs.

3.4. ACK/NACK Transmission and Reception Method 4

When a UE performs ACK/NACK bundling on multiple ACK/NACK bits (per CBG) corresponding to multiple PDSCHs (TBs or CBGs), the UE may perform gradual inter-CBG bundling (per TB index) as follows depending on the (transmittable) ACK/NACK payload size.

(1) Option 1: The gradual inter-CBG bundling (per TB index) is performed on a TB basis.

The ACK/NACK bundling is allowed only when ACK/NACK payload size>max PUCCH payload size. Specifically, the ACK/NACK bundling is performed as follows.

If no inter-CBG bundling (per TB index) is performed before, the inter-CBG bundling (per TB index) is performed on the first TB.

If the inter-CBG bundling (per TB index) is performed on a k-th TB before, the inter-CBG bundling (per TB index) is performed on a (k+1)-th TB.

The TB order may be determined according to one of the following methods.
- Alt 1: The priority may increase as the CC index increases (or decreases), the slot index increases (or decreases) (in the same CC index), and/or the TB index increases (or decreases) (in the same slot index).
- Alt 2: The priority may increase as the slot index increases (or decreases), the CC index increases (or decreases) (in the same slot index), and/or the TB index increases (or decreases) (in the same CC index).
- Alt 3: The priority may increase as the counter-DAI (downlink assignment index) increases (or decreases).

(2) Option 2: The gradual inter-CBG bundling (per TB index) is performed on a PDSCH (or slot) basis.

The ACK/NACK bundling is allowed only when ACK/NACK payload size>max PUCCH payload size. Specifically, the ACK/NACK bundling is performed as follows.
- If no inter-CBG bundling (per TB index) is performed before, the inter-CBG bundling (per TB index) is performed on the first PDSCH (or slot).
- If the inter-CBG bundling (per TB index) is performed on a k-th PDSCH (or slot) before, the inter-CBG bundling (per TB index) is performed on a (k+1)-th PDSCH (or slot).

The PDSCH (or slot) order may be determined according to one of the following methods.
- Alt 1: The priority may increase as the CC index increases (or decreases) and/or the slot index increases (or decreases) (in the same CC index).
- Alt 2: The priority may increase as the slot index increases (or decreases) and/or the CC index increases (or decreases) (in the same slot index).
- Alt 3: The priority may increase as the counter-DAI increases (or decreases).

(3) Option 3: The gradual inter-CBG bundling (per TB) is performed on a component carrier (CC) basis.

The ACK/NACK bundling is allowed only when ACK/NACK payload size>max PUCCH payload size. Specifically, the ACK/NACK bundling is performed as follows.
- If no inter-CBG bundling (per TB index) is performed before, the inter-CBG bundling (per TB index) is performed on the first CC.
- If the inter-CBG bundling (per TB index) is performed on a k-th slot before, the inter-CBG bundling (per TB index) is performed on a (k+1)-th CC.

The CC order may be determined according to one of the following methods.
- Alt 1: The priority may increase as the CC index increases (or decreases).
- Alt 2: The priority may increase as the counter-DAI increases (or decreases).

(4) Option 4: The inter-CBG bundling (per TB index) is performed at a time on all PDSCHs (all slot/CC combinations or all counter DAI values) (where ACK/NACK transmission is required).

The inter-CBG bundling (per TB index) may mean an operation of performing ACK/NACK bundling on ACK/NACK bits (per CBG) corresponding to CBGs (with the same TB index) in a PDSCH.

The ACK/NACK payload size may be updated whenever the inter-CBG bundling (per TB index) is performed, and the max PUCCH payload size may mean the maximum payload size that can be transmitted on a PUCCH.

If the sum of the (updated) ACK/NACK payload sizes becomes less than the maximum ACK/NACK payload size that can be transmitted on the PUCCH (max PUCCH payload) while the UE performs the gradual inter-CBG bundling (per TB index), the UE may stop the inter-CBG bundling (per TB index).

In addition, if there is no CBG in a TB where the inter-CBG bundling (per TB index) is required, the UE may skip the ACK/NACK bundling on CBGs in the corresponding TB.

FIGS. 14 to 17 are diagrams schematically illustrating ACK/NACK bundling methods according to the options of ACK/NACK transmission and reception method 4 of the present disclosure and ACK/NACK transmission and reception methods based thereon.

Figure 14:
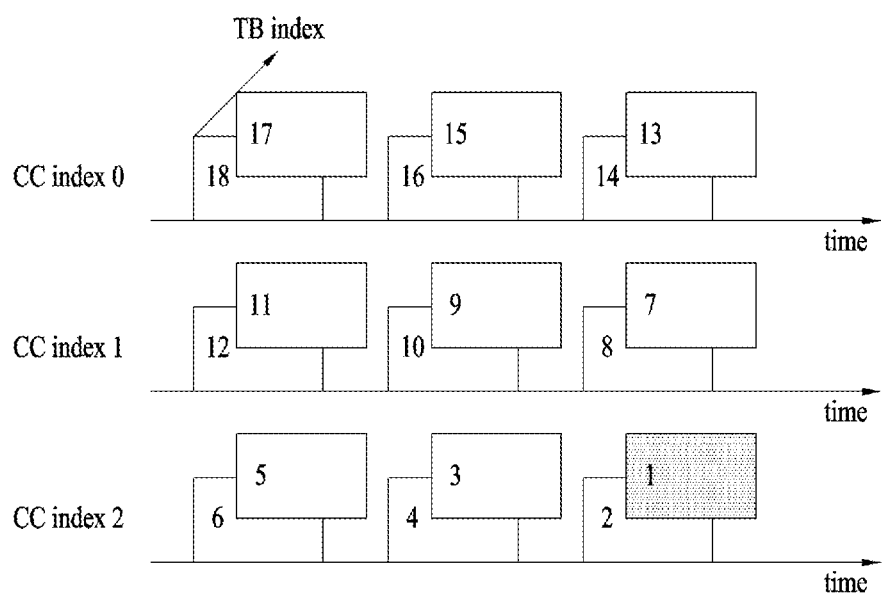
FIGS. 14 to 17 are diagrams schematically illustrating ACK/NACK bundling methods according to the options of ACK/NACK transmission and reception method 4 of the present disclosure and ACK/NACK transmission and reception methods based thereon.
Figure 15:
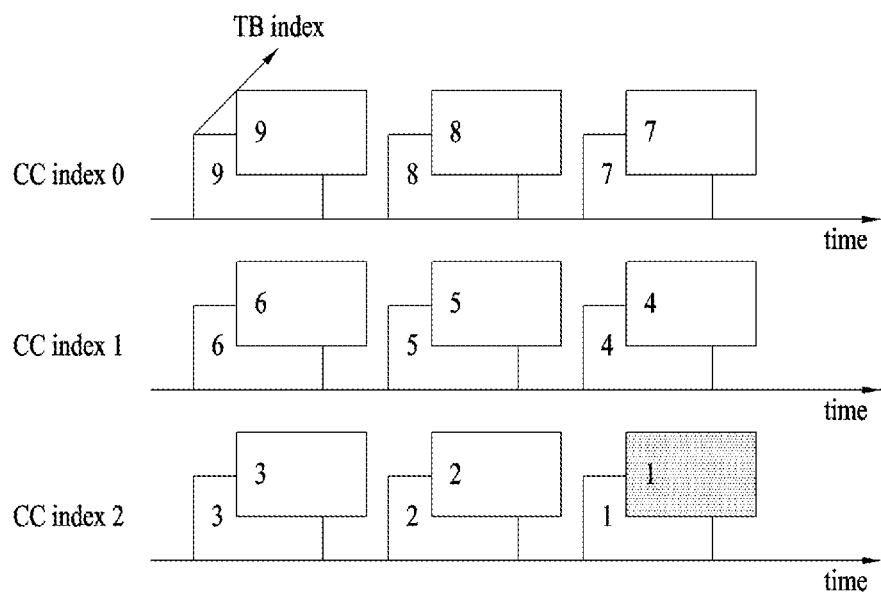
Figure 16:
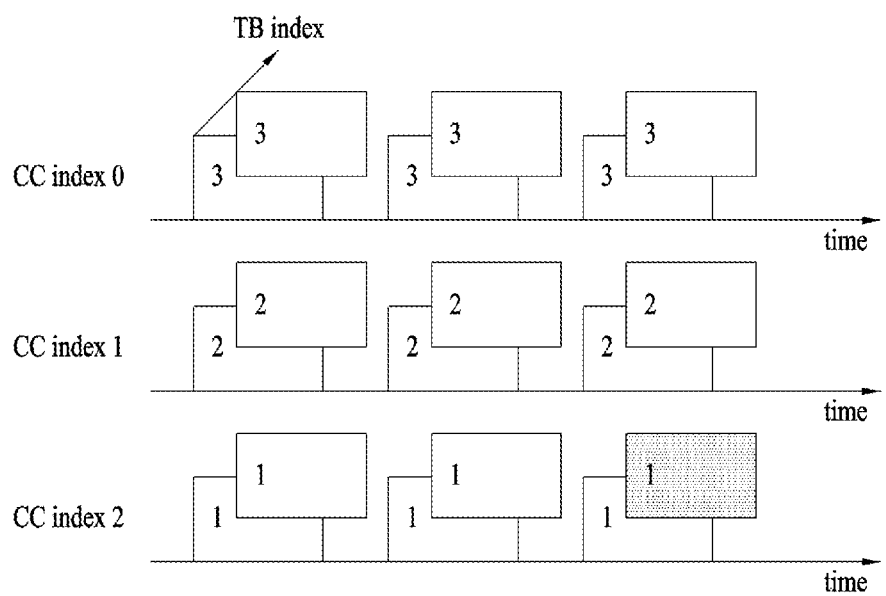
Figure 17:
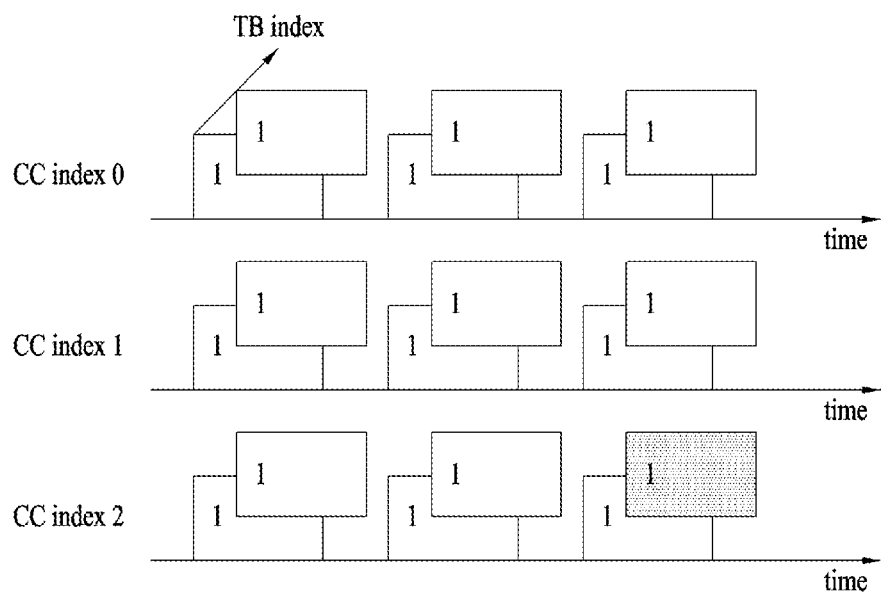

Specifically, FIG. 14 schematically illustrates a configuration in which gradual inter-CBG bundling (per TB index) is performed on a TB basis, FIG. 15 schematically illustrates a configuration in which gradual inter-CBG bundling (per TB index) is performed on a PDSCH or (slot) basis, FIG. 16 schematically illustrates a configuration in which gradual inter-CBG bundling (per TB index) is performed on a CC basis, and FIG. 17 schematically illustrates a configuration in which inter-CBG bundling (per TB index) is performed at a time on all PDSCHs.

For example, assuming that a UE performs gradual inter-CBG bundling (per TB index) on PDSCHs corresponding to three CCs (e.g., CC index 0, CC index 1, and CC index 2) and three slots, the ACK/NACK transmission and reception methods according to the above-described options may be performed as shown in FIGS. 14 to 17, respectively.

In FIGS. 14 to 17, it is assumed that the order of applying the inter-CBG bundling (per TB index) is prioritized as the CC index increases, the slot index increases (in the same CC index), and/or the TB index increases (in the same slot index). In addition, the shadow area represents a unit in which the inter-CBG bundling (per TB index) is performed (i.e., a TB), and the number represents the order of applying the inter-CBG bundling (per TB index).

ACK/NACK transmission and reception method 4 may be applied together with other proposed methods of the present disclosure unless they collide with each other.

3.5. ACK/NACK Transmission and Reception Method 5

When a UE performs ACK/NACK bundling on multiple ACK/NACK bits (per CBG) corresponding to multiple PDSCHs (TBs or CBGs), the UE may perform gradual inter-TB bundling (per CBG index) as follows depending on the (transmittable) ACK/NACK payload size.

1) Option 1: The gradual inter-TB bundling (per CBG index) is performed on a PDSCH (or slot) basis.

The ACK/NACK bundling is allowed only when ACK/NACK payload size>max PUCCH payload size. Specifically, the ACK/NACK bundling is performed as follows.
- If no inter-TB bundling (per CBG index) is performed before, the inter-TB bundling (per CBG index) is performed on the first slot.
- If the inter-TB bundling (per CBG index) is performed on a k-th slot before, the inter-TB bundling (per CBG index) is performed on a (k+1)-th slot.

The PDSCH (or slot) order may be determined according to one of the following methods.
- Alt 1: The priority may increase as the CC index increases (or decreases) and/or the slot index increases (or decreases) (in the same CC index).

Alt 2: The priority may increase as the slot index increases (or decreases) and/or the CC index increases (or decreases) (in the same slot index).

Alt 3: The priority may increase as the counter-DAI increases (or decreases).

(2) Option 2: The gradual inter-TB bundling (per CBG index) is performed on a CC basis.

The ACK/NACK bundling is allowed only when ACK/NACK payload size>max PUCCH payload size. Specifically, the ACK/NACK bundling is performed as follows.

If no inter-TB bundling (per CBG index) is performed before, the inter-TB bundling (per CBG index) is performed on the first CC.

If the inter-TB bundling (per CBG index) is performed on a k-th slot before, the inter-TB bundling (per CBG index) is performed on a (k+1)-th CC.

The CC order may be determined according to one of the following methods.

Alt 1: The priority may increase as the CC index increases (or decreases).

Alt 2: The priority may increase as the counter-DAI increases (or decreases).

(3) Option 3: The inter-TB bundling (per CBG index) is performed at a time on all PDSCHs (all slot/CC combinations or all counter DAI values) (where ACK/NACK transmission is required).

The inter-TB bundling (per CBG index) may mean an operation of performing ACK/NACK bundling on ACK/NACK bits (per CBG) corresponding to multiple TBs (with the same CBG index) in a PDSCH.

The ACK/NACK payload size may be updated whenever the inter-TB bundling (per CBG index) is performed, and the max PUCCH payload size may mean the maximum payload size that can be transmitted on a PUCCH.

If the sum of the (updated) ACK/NACK payload sizes becomes less than the maximum ACK/NACK payload size that can be transmitted on the PUCCH (max PUCCH payload) while the UE performs the gradual inter-TB bundling (per CBG index), the UE may stop the inter-TB bundling (per CBG index).

In addition, if there is one TB in a PDSCH where the inter-TB bundling (per CBG index) is required, the UE may skip the ACK/NACK bundling on TBs in the corresponding PDSCH.

Figure 18:
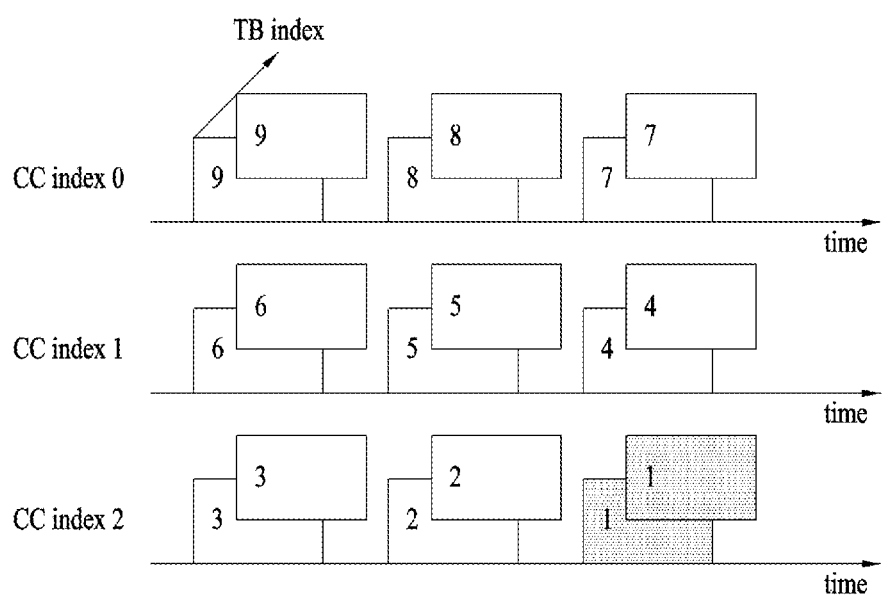
FIGS. 18 to 20 are diagrams schematically illustrating ACK/NACK bundling methods according to the options of ACK/NACK transmission and reception method 5 of the present disclosure and ACK/NACK transmission and reception methods based thereon.
Figure 19:
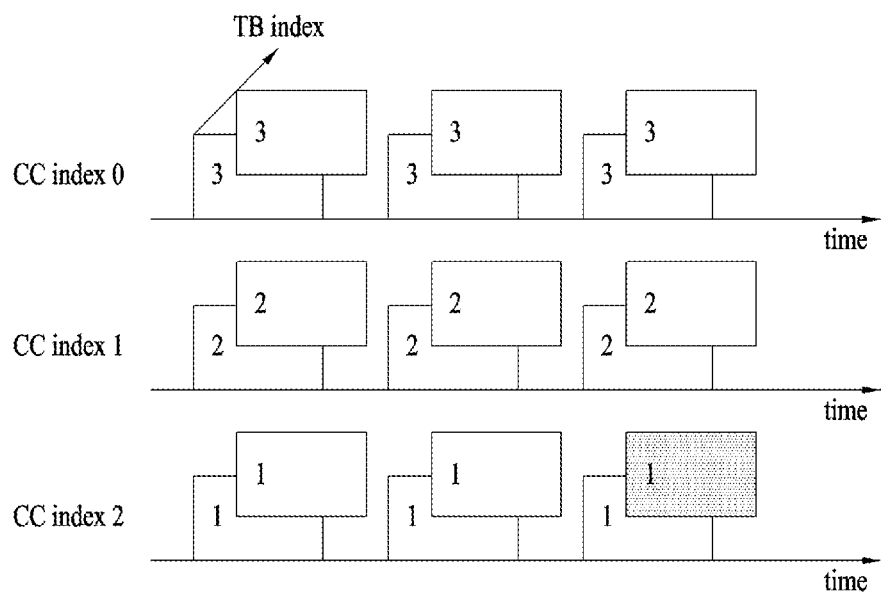
Figure 20:
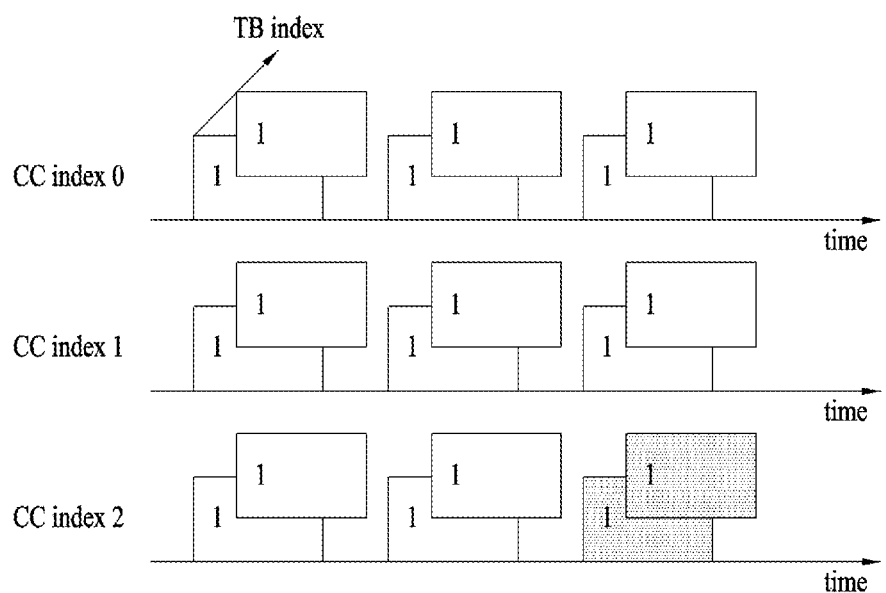

FIGS. 18 to 20 are diagrams schematically illustrating ACK/NACK bundling methods according to the options of ACK/NACK transmission and reception method 5 of the present disclosure and ACK/NACK transmission and reception methods based thereon.

Specifically, FIG. 18 schematically illustrates a configuration in which gradual inter-TB bundling (per CBG index) is performed on a PDSCH (or slot) basis, FIG. 19 schematically illustrates a configuration in which gradual inter-TB bundling (per CBG index) is performed on a CC basis, and FIG. 20 schematically illustrates a configuration in which inter-TB bundling (per CBG index) is performed at a time on all PDSCHs.

For example, assuming that a UE performs gradual inter TB bundling (per CBG index) on PDSCHs corresponding to three CCs (e.g., CC index 0, CC index 1, and CC index 2) and three slots, the ACK/NACK transmission and reception methods according to the above-described options may be performed as shown in FIGS. 18 to 20, respectively.

In FIGS. 18 to 20, it is assumed that the order of applying the inter-TB bundling (per CBG index) is prioritized as the CC index increases and/or the slot index increases (in the same CC index). In addition, the shadow area represents a unit in which the inter TB bundling (per CBG index) is performed (i.e., a PDSCH), and the number represents the order of applying the inter TB bundling (per CBG index).

ACK/NACK transmission and reception method 5 may be applied together with other proposed methods of the present disclosure unless they collide with each other.

3.6. ACK/NACK Transmission and Reception Method 6

When a UE performs ACK/NACK bundling on multiple ACK/NACK bits (per CBG) corresponding to multiple PDSCHs (TBs or CBGs), the UE may perform gradual inter-slot bundling as follows depending on the (transmittable) ACK/NACK payload size.

(1) Option 1: The gradual inter-slot bundling is performed on a CC basis.

The ACK/NACK bundling is allowed only when ACK/NACK payload size>max PUCCH payload size. Specifically, the ACK/NACK bundling is performed as follows.

If no inter-slot bundling is performed before, the inter-slot bundling is performed on the first slot.

If the inter-slot bundling is performed on a k-th slot before, the inter-slot bundling is performed on a (k+1)-th CC.

The CC order may be determined according to one of the following methods.

Alt 1: The priority may increase as the CC index increases (or decreases).

Alt 2: The priority may increase as the counter-DAI increases (or decreases).

(2) Option 2: The inter-slot bundling is performed at a time on all PDSCHs (all slot/CC combinations or all counter DAI values) (where ACK/NACK transmission is required).

The inter-slot bundling may mean an operation of performing ACK/NACK bundling on ACK/NACK bits per TB (or CBG) corresponding to multiple TBs (or CBGs) (with the same TB index (or CBG index)) in a CC.

The ACK/NACK payload size may be updated whenever the inter-slot bundling is performed, and the max PUCCH payload size may mean the maximum payload size that can be transmitted on a PUCCH.

If the sum of the (updated) ACK/NACK payload sizes becomes less than the maximum ACK/NACK payload size that can be transmitted on the PUCCH (max PUCCH payload) while the UE performs the gradual inter-slot bundling, the UE may stop the inter-slot bundling.

In addition, if there is one slot in a CC where the inter-slot bundling is required, the UE may skip the ACK/NACK bundling on slots in the corresponding CC.

Figure 21:
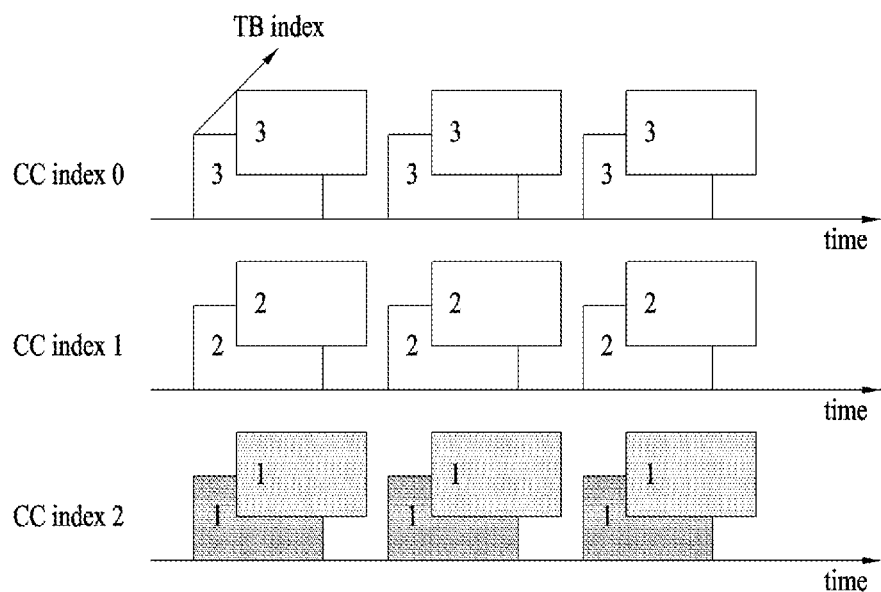
FIGS. 21 and 22 are diagrams schematically illustrating ACK/NACK bundling methods according to the options of ACK/NACK transmission and reception method 6 of the present disclosure and ACK/NACK transmission and reception methods based thereon.
Figure 22:
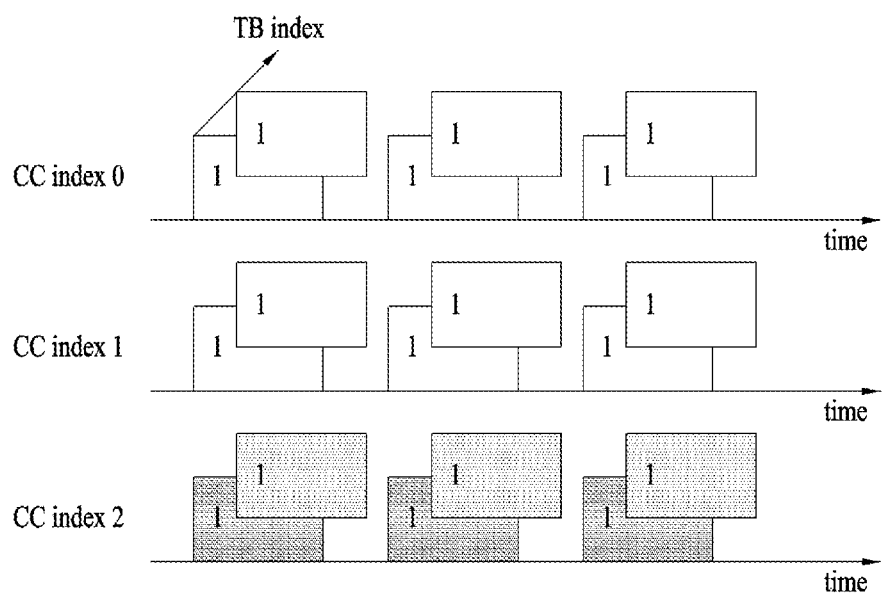

FIGS. 21 and 22 are diagrams schematically illustrating ACK/NACK bundling methods according to the options of ACK/NACK transmission and reception method 6 of the present disclosure and ACK/NACK transmission and reception methods based thereon.

Specifically, FIG. 21 schematically illustrates a configuration in which gradual inter-slot bundling is performed on a CC basis, and FIG. 22 schematically illustrates a configuration in which inter-slot bundling is performed at a time on all PDSCHs.

For example, assuming that a UE performs gradual inter-slot bundling on PDSCHs corresponding to three CCs (e.g., CC index 0, CC index 1, and CC index 2) and three slots, the ACK/NACK transmission and reception methods according to the above-described options may be performed as shown in FIGS. 21 and 22, respectively.

In FIGS. 21 and 22, it is assumed that the order of applying the inter-slot bundling is prioritized as the CC index increases. In addition, the shadow area represents a unit in which the inter-slot bundling is performed (i.e., a CC), and the number represents the order of applying the inter-slot bundling. In addition, in FIGS. 21 and 22, the light and dark shadow areas mean that the inter-slot bundling is performed for different TB indices.

ACK/NACK transmission and reception method 6 may be applied together with other proposed methods of the present disclosure unless they collide with each other.

Additionally, when a UE performs gradual inter-CBG (inter-TB or inter-slot) bundling according to one of ACK/NACK transmission and reception method 4, ACK/NACK transmission and reception method 5, and ACK/NACK transmission and reception method 6, the order of applying the gradual ACK/NACK bundling to multiple PDSCHs may be changed depending on the transmission mode (TM) applied to each PDSCH, whether CBG-based transmission (or retransmission) is configured, etc.

For example, assuming that TM 1 is TM based on a single TB and TM 2 is TM based on two TBs, a UE may preferentially apply gradual inter-TB bundling (per CBG index) to PDSCHs corresponding to TM 2.

As another example, if CBG-based transmission (or retransmission)/HARQ-ACK transmission is configured for PDSCHs in CC 1 and the CBG-based transmission (or retransmission)/HARQ-ACK transmission is not configured for PDSCHs in CC 2, the order of applying gradual inter-CBG bundling (per TB index) may be defined such that CC 1 (where the CBG-based transmission (or retransmission)/HARQ-ACK transmission is configured) is prioritized over CC 2.

3.7. ACK/NACK Transmission and Reception Method 7

When at least one of the following gradual ACK/NACK bundling methods described in ACK/NACK transmission and reception method 4, ACK/NACK transmission and reception method 5, and ACK/NACK transmission and reception method 6 is supported, (1) Gradual inter-CBG bundling (per TB index) (e.g., ACK/NACK transmission and reception method 4)
(2) Gradual inter-TB bundling (per CBG index) (e.g., ACK/NACK transmission and reception method 5)
(3) Gradual inter-Slot bundling (e.g., ACK/NACK transmission and reception method 6)

A UE may perform ACK/NACK bundling as follows.

1) Option 1: After performing one-shot inter-CBG bundling (per TB index) (on all PDSCHs where ACK/NACK transmission is required)
  If ACK/NACK payload size>max PUCCH payload size
    Option 1-A: The UE performs gradual inter-TB bundling (per CBG index).
    Option 1-B: The UE performs gradual inter-slot bundling.
  Otherwise, the UE performs no additional ACK/NACK bundling.

2) Option 2: After performing one-shot inter-TB bundling (per CBG index) (on all PDSCHs where ACK/NACK transmission is required
  If ACK/NACK payload size>max PUCCH payload size
    Option 2-A: The UE performs gradual inter-CBG bundling (per TB index).
    Option 2-B: The UE performs gradual inter-slot bundling.
  Otherwise, the UE performs no additional ACK/NACK bundling.

In this case, the max PUCCH payload size may mean the maximum payload size that can be transmitted on a PUCCH.

For example, it is assumed that four CBGs are configured in each TB and a UE performs ACK/NACK bundling on three PDSCHs, each of which carries two TBs.

In this case, the ACK/NACK payload size before the ACK/NACK bundling is 24 bits=3 (the number of PDSCHs)*2 (the number of TBs per PDSCH)*4 (the number of CBGs per TB). If the maximum PUCCH payload size that can be transmitted on a PUCCH resource is 4 bits, the UE may compress 24 bits into 6 bits by applying one-shot inter-CBG bundling (per TB index) to all PDSCHs. Thereafter, when performing gradual inter-slot bundling, the UE may further compress the total ACK/NACK payload size into 4 bits=2+1+1 by performing inter-TB bundling (per CBG index) on two PDSCHs among the three PDSCHs.

This process may be generalized as follows. When a UE performs inter-CBG bundling (per TB index), inter-TB bundling (per CBG index), and/or inter-slot bundling (on all PDSCHs where ACK/NACK transmission is required) (at a time), if ACK/NACK payload size>max PUCCH payload size after ACK/NACK bundling, the UE may additionally perform gradual inter-CBG (inter-TB or inter-slot) bundling.

ACK/NACK transmission and reception method 7 may be applied together with other proposed methods of the present disclosure unless they collide with each other.

3.8. ACK/NACK Transmission and Reception Method 8

For N PDSCHs (transmitted on a specific carrier), if M TBs are transmitted on each PDSCH and L CBGs are configured for each TB, a UE may perform ACK/NACK bundling for ACKs/NACKs corresponding to multiple PDSCHs according to one of the following options.

(1) Option 1: Inter-CBG bundling (per TB index)
The ACK/NACK bundling is performed on ACK/NACK bits (per CBG) corresponding to multiple CBGs (with the same TB index) in a PDSCH.
The total ACK/NACK payload size is N*M bits.
A PUCCH resource may be configured according to one of the following methods.
  N*M bits are transmitted on a single PUCCH resource for multiple PDSCHs.
  M bits are transmitted on a single PUCCH resource for each PDSCH (i.e., the total number of PUCCH resources is N).

(2) Option 2: Inter-TB bundling (per CBG index)
The ACK/NACK bundling is performed on ACK/NACK bits (per CBG) corresponding to multiple TBs (with the same CBG index) in a PDSCH.
The total ACK/NACK payload size is N*L bits.
A PUCCH resource may be configured according to one of the following methods.
  N*L bits are transmitted on a single PUCCH resource for multiple PDSCHs.
  L bits are transmitted on a single PUCCH resource for each PDSCH (i.e., the total number of PUCCH resources is N).

(3) Option 3: Inter-slot bundling
The ACK/NACK bundling is performed on ACK/NACK bits per TB (or CBG) with the same TB index (and CBG index) in a CC.
The total ACK/NACK payload size is M*L bits.
A PUCCH resource may be configured according to one of the following methods.
  M*L bits are transmitted on a single PUCCH resource. When this option is applied, a counter-DAI field indicating the order of PDSCHs may need to be included in DL scheduling DCI.

(4) Option 4: Inter-TB/CBG bundling (per PDSCH) (Option 1+Option 2)
  The ACK/NACK bundling is performed on ACK/NACK bits per TB (or CBG) corresponding to all TBs (or CBGs) in a PDSCH.
  The total ACK/NACK payload size is N bits.
  A PUCCH resource may be configured according to one of the following methods.
    N bits are transmitted on a single PUCCH resource.
    1 bit is transmitted on a single PUCCH resource for each PDSCH (i.e., the total number of PUCCH resources is N).
(5) Option 5: Inter-CBG bundling (per TB index)+Inter-slot bundling (Option 1+Option 3)
  The ACK/NACK bundling is first performed on ACK/NACK bits (per CBG) corresponding to multiple TBs (with the same CBG index) in a PDSCH and then performed on (bundled) ACK/NACK bits per TB corresponding to multiple PDSCHs with the same TB index in a CC.
  The total ACK/NACK payload size is M bits.
  A PUCCH resource may be configured according to one of the following methods.
    M bits are transmitted on a single PUCCH resource.
    When this option is applied, a counter-DAI field indicating the order of PDSCHs may need to be included in DL scheduling DCI.
(6) Option 6: Inter-TB bundling (per CBG index)+Inter-slot bundling (Option 2+Option 3)
  The ACK/NACK bundling is first performed on ACK/NACK bits (per CBG) corresponding to multiple TBs (with the same CBG index) in a PDSCH and then performed on (bundled) ACK/NACK bits per CBG corresponding to multiple PDSCHs with the same CBG index in a CC.
  The total ACK/NACK payload size is L bits.
  A PUCCH resource may be configured according to one of the following methods.
    L bits are transmitted on a single PUCCH resource.
    When this option is applied, a counter-DAI field indicating the order of PDSCHs may need to be included in DL scheduling DCI.
(7) Option 7: Inter-TB/CBG bundling (per PDSCH)+Inter-slot bundling (Option 4+Option 3)
  The ACK/NACK bundling is first performed on ACK/NACK bits per TB (or CBG) corresponding to all TBs (or CBGs) in a PDSCH and then performed on (bundled) ACK/NACK bits corresponding to multiple PDSCHs in a CC.
  The total ACK/NACK payload size is 1 bit.
  A PUCCH resource may be configured according to one of the following methods.
    1 bit is transmitted on a single PUCCH resource.
    When this option is applied, a counter-DAI field indicating the order of PDSCHs may need to be included in DL scheduling DCI.
(8) Option 8: (consecutive) ACK counter
  The total number of (consecutive) ACKs are cyclically mapped to a QPSK constellation.
  The total ACK/NACK payload size is 2 bits.
  A PUCCH resource may be configured according to one of the following methods.
    2 bit is transmitted on a single PUCCH resource.
    When this option is applied, a counter-DAI field indicating the order of PDSCHs may need to be included in DL scheduling DCI.

In this case, the max PUCCH payload size may mean the maximum payload size that can be transmitted on a PUCCH.

A BS may configure one of the above ACK/NACK bundling methods for a UE through higher layer signaling. Alternatively, the BS may configure multiple ACK/NACK bundling methods for the UE through higher layer signaling and then inform the UE of one of the configured ACK/NACK bundling methods through DCI. Further, the UE may select one of the ACK/NACK bundling methods according to a specific rule and then apply the selected ACK/NACK bundling method.

For example, a UE may select and apply one of the above-described options according to the ratio of the ACK/NACK payload size before ACK/NACK bundling and the (maximum) UCI payload size that can be transmitted on a PUCCH (max PUCCH payload size) (for example, R=(ACK/NACK payload size)/(max PUCCH payload size)).

Assuming that for N PDSCHs (transmitted on a specific carrier), M TBs are transmitted on each PDSCH, and L CBGs are configured for each TB, ACK/NACK bits (per CBG) before ACK/NACK bundling may correspond to N*M*L bits. Table 6 shows the compression ratio of the ACK/NACK payload size (ACK/NACK compression ratio) according to each option.

TABLE 6

| ACK/NACK bundling option | Ratio |
|---|---|
| Option 1 | 1/L |
| Option 2 | 1/M |
| Option 3 | 1/N |
| Option 4 | 1/(M*L) |
| Option 5 | 1/(N*L) |
| Option 6 | 1/(N*M) |
| Option 7 | 1/(N*M*L) |
| Option 8 | — |

For example, it is assumed that N=4, M=2, and L=4. In this case, if the ACK/NACK payload size should be compressed by more than one-third due to a limitation on the UCI payload size that can be transmitted on a PUCCH, a UE may apply option 1 (1/4) or option 3 (1/4) (alternatively, a BS may instruct the UE to apply option 1 (1/4) or option 3 (1/4)).

In this case, the UE may apply an ACK/NACK bundling option with the highest ACK/NACK compression ratio among ACK/NACK bundling options with ACK/NACK compression ratios less than the required ACK/NACK compression ratio. If there are multiple ACK/NACK bundling options with the same ACK/NACK compression ratio, the multiple ACK/NACK bundling options may be prioritized in ascending order of ACK/NACK bundling ranges (e.g., Option 1>Option 2>Option 3, Option 4>Option 5>Option 6, etc.).

ACK/NACK transmission and reception method 8 may be applied together with other proposed methods of the present disclosure unless they collide with each other.

3.9. ACK/NACK Transmission and Reception Method 9

When a UE is configured with a (slot index) set where ACK/NACK transmission (on a PUCCH) is required (for a specific carrier), if the UE performs (inter-slot) ACK/NACK bundling for scheduled PDSCHs within the set, there may be a problem that DL scheduling for a specific PDSCH within the set is missing. This problem may be solved as follows.

(1) A case in which the counter-DAI is present (in DL scheduling DCI)
  Option 1-1: The value of an ACK/NACK resource indicator (ARI) (in the DL scheduling DCI) is configured differently for each counter-DAI value.
    For example, the ARI value may be obtained by applying the Modulo M operation to a PDSCH scheduling order value, which is estimated from the counter-DAI value (where M may be the total number of states of the ART).
  Option 1-2: A PUCCH resource is allocated according to the counter-DAI value.
    For example, the PUCCH resource may be allocated by a function having as input the counter-DAI value.
  Option 1-3: A PUCCH resource group is indicated by the ARI, and one PUCCH resource selected from the PUCCH resource group is indicated by the counter-DAI value.
(2) A case in which no counter-DAI is present (in DL scheduling DCI)
  Option 2-1: The total number of PDSCHs where ACK/NACK transmission is required is provided to the UE using the total-DAI value (in the DL scheduling DCI).
  Option 2-2: In addition to ACK/NACK information, the UE additionally reports one of the following information.
    (explicit) ACK/NACK payload size
    Total-DAI value (obtained by UE)
    Bitmap information indicating whether there is DL scheduling missing for each PDSCH The counter-DAI may mean a bit field for indicating the scheduling order of PDSCHs, and the total-DAI value may mean a bit field for indicating the total number of scheduled PDSCHs.

The ARI may mean a bit field for indicating a PUCCH resource.

For example, a (slot index) set where ACK/NACK transmission (on a PUCCH) is required may be configured with the locations of an SF (or slot), which is inversely calculated with respect to the HARQ-ACK timing configured for a UE. That is, when the UE is configured with n+4, n+5, n+6, or n+7 as a HARQ-ACK timing (regarding reception of an n-th PDSCH), a (slot index) set where ACK/NACK transmission is required for a PUCCH resource in a k-th slot (or SF) may be represented by a (k−4)-th, (k−5)-th, (k−6)-th, or (k−7)-th slot (or SF).

In this case, if the UE intends to perform (inter-slot) ACK/NACK bundling on the (slot index) set, the UE may perform the (inter-slot) ACK/NACK bundling only on ACK/NACK information corresponding to actually scheduled PDSCHs.

However, the UE may miss DL scheduling DCI on a PDSCH scheduled by a BS. In this case, the UE's report on the (bundled) ACK/NACK information may be different from the interpretation thereof by the BS.

For example, it is assumed that when the UE performs the (inter-slot) ACK/NACK bundling on multiple PDSCHs, each having one TB, the BS schedules four PDSCHs and the UE receives three among the four PDSCHs. If the UE reports ACK information as (bundled) ACKs/NACKs by detecting ACKs for the three PDSCHs, the BS may misunderstand that the ACKs are detected for all of the four PDSCHs scheduled by the BS.

Thus, the DL scheduling missing problem for PDSCHs between a BS and a UE where ACK/NACK transmission is required should be solved.

If the counter-DAI is present, the order between continuously scheduled PDSCHs is indicated by the counter-DAI. Thus, even if the UE misses a scheduled PDSCH, the UE may recognize that the scheduled PDSCH is missing. However, there may be a problem when the UE miss the lastly scheduled PDSCH, and therefore, the present disclosure proposes the following solutions.

As one method, the BS may allocate a different ARI value (or PUCCH resource) depending on the counter-DAI value (in DL scheduling DCI) (or the PDSCH scheduling order indicated by the counter-DAI).

For example, when the BS schedules up to an M-th PDSCH but the UE detects only up to an (M−1)-th PDSCH, it is expected that the UE will perform ACK/NACK transmission on a PUCCH resource corresponding to the (M−1)-th PDSCH (which is different from a PUCCH resource corresponding to the M-th PDSCH). Thus, the BS may estimate based on the detection results of PUCCH resources how many PDSCHs the UE receives.

When there is no counter-DAI, the BS may inform the UE of the total number of PDSCHs to be scheduled through the total-DAI in advance. When the UE reports (bundled) ACKs/NACKs after preforming the (inter-slot) ACK/NACK bundling, if the number of PDSCHs indicated by the total-DAI is more than the total number of (received) PDSCHs recognized by the UE, the UE may determine that DL scheduling missing for a specific PDSCH occurs and then report to the BS 'All NACK' or drop PUCCH transmission. Alternatively, when reporting ACK/NACK information, the UE may additionally report information on DL scheduling missing (e.g., (explicit) ACK/NACK payload size, total-DAI value (from the perspective of the UE), and/or bitmap information indicating whether there is DL scheduling missing for each PDSCH). In this case, the BS may determine the presence or absence of DCI missing from the additional information and re-analyze the ACK/NACK information reported by the UE.

Specifically, the following options may be considered as a PUCCH resource allocation method (when the counter-DAI is present in DCI and inter-slot bundling is capable of being applied).

1) Option 3: When the counter-DAI is present in DCI, a different PUCCH resource is allocated for each counter-DAI value (or for each PDSCH order value implied by the counter-DAI).
  Option 3-1: For each ARI value, a single PUCCH resource is (independently) configured through higher layer signaling (e.g., RRC signaling), a different ARI value is allocated for each counter-DAI value (or for each PDSCH order value implied by the counter-DAI), and then, the PUCCH resource is allocated according to the ARI value.
  Option 3-2: For each ARI value, a single PUCCH resource is (independently) configured through higher layer signaling (e.g., RRC signaling), the same ARI value is allocated for each counter-DAI value (or for each PDSCH order value implied by the counter-DAI), and then the final PUCCH resource is allocated by applying the counter-DAI value (or the PDSCH order value implied by the counter-DAI) as an index offset value for the PUCCH resource indicated by the ARI.
  Option 3-3: For each ARI value, a PUCCH resource set is (independently) configured through higher layer signaling (e.g., RRC signaling), and the same ARI value is allocated for each counter-DAI value (or for each PDSCH order value implied by the counter-DAI). Thereafter, for each counter-DAI value (or for each PDSCH order value implied by the counter-DAI), a different PUCCH resource is selected from the PUCCH resource set indicated by the ARI and then allocated.

Option 3-4: For each counter-DAI value (or for each PDSCH order value implied by the counter-DAI), a single PUCCH resource is (independently) configured through higher layer signaling (e.g., RRC signaling) with no ARI. The PUCCH resource is allocated according to the counter-DAI value.

2) Option 4: When the counter-DAI and the total-DAI are present in DCI, the same ARI value is allocated for each counter-DAI value (or for each PDSCH order value implied by the counter-DAI), and a PUCCH resource is allocated according to the ARI value.

3) Option 5: When the counter-DAI is present in DCI and the total-DAI is present in UCI, the same ARI value is allocated for each counter-DAI value (or for each PDSCH order value implied by the counter-DAI), and a PUCCH resource is allocated according to the ARI value.

4) Option 6: When bitmap information indicating the presence or absence of scheduling is present in UCI, the same ARI value is allocated for each counter-DAI value (or for each PDSCH order value implied by the counter-DAI), and a PUCCH resource is allocated according to the ARI value.

Additionally, when the counter-DAI is present in DCI and (inter-slot) ACK/NACK bundling is applied to slots where the counter-DAI value is allocated (hereinafter referred to as inter-DAI bundling), a UE may use one of the following options.

<1> Option 7: The ACK/NACK bundling is performed on slots corresponding to all DAI values including the lastly received DAI.

For example, when DAI values of 1, 2, and 4 are received, the UE may perform DTX (i.e., transmits no PUCCH) or transmits a bundled NACK on a PUCCH resource corresponding to DAI=4.

<2> Option 8: The ACK/NACK bundling is performed only on slots corresponding to DAI values continuously received from the initial DAI value.

For example, when DAI values of 1, 2, and 4 are received, the UE may transmit bundled ACKs/NACKs for DAI=1 and DAI=2 on a PUCCH resource corresponding to DAI=2.

ACK/NACK transmission and reception method 9 may be applied together with other proposed methods of the present disclosure unless they collide with each other.

Figure 23:
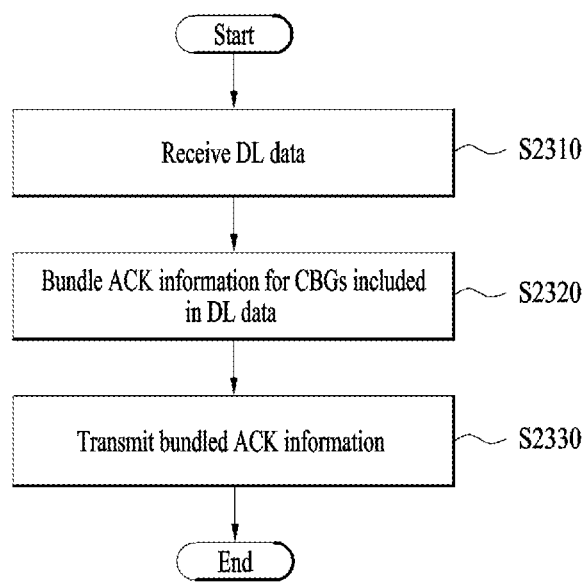
FIG. 23 is a flowchart illustrating a method by which a UE transmits acknowledgement information according to the present disclosure.

FIG. 23 is a flowchart illustrating a method by which a UE transmits ACK information according to the present disclosure.

The UE receives DL data from a BS (S2310).

The received DL data may be N pieces of DL data (where N is a natural number).

In this case, one piece of DL data may include M TBs (where M is a natural number), and one TB may include L CBGs (where L is a natural number).

Thus, the N pieces of DL data may include a total of N*M*L CBGs.

The UE bundles ACK information for CBGs included in the received DL data (S2320).

Specifically, the UE bundles ACK information for a total of N*M*L CBGs included in the N pieces of DL data into X-bit ACK information (where X is a natural number more than or equal to 1 and less than N*M*L) based on a predetermined rule.

According to the present disclosure, the predetermined rule may include the following various rules.

For example, the predetermined rule may correspond to a first rule where ACK information for all CBGs included in the same TB is bundled. In this case, X may correspond to N*M.

As another example, the predetermined rule may correspond to a second rule where ACK information for all CBGs having the same CBG index for each TB and included in the same DL data is bundled. In this case, X may correspond to N*L.

As still another example, the predetermined rule may correspond to a third rule where ACK information for all CBGs having the same CBG index for each TB and included in TBs with the same TB index for each piece of DL data is bundled. In this case, X may correspond to M*L.

As yet another example, the predetermined rule may correspond to a fourth rule where ACK information for all CBGs included in the same DL data is bundled. In this case, X may correspond to N.

As a further example, the predetermined rule may correspond to a fifth rule where ACK information for all CBGs included in the same TB is bundled as first ACK information and the first ACK information for all TBs with the same TB index for each piece of DL data is bundled as second ACK information. In this case, X may correspond to M.

As a still further example, the predetermined rule may correspond to a sixth rule where ACK information for all CBGs with the same CBG index for all TBs included in the N pieces of DL data is bundled. In this case, and X may correspond to L.

As an even further example, the predetermined rule may correspond to a seventh rule where the ACK information for the N*M*L CBGs is bundled. In this case, X may correspond to 1.

As a yet further example, the predetermined rule may correspond to an eighth rule where although the ACK information for the N*M*L CBGs is gradually bundled, the bundling is stopped if the size of ACK information bundled until step Y (Y is a natural number) is less than or equal to a specific bit size.

As described above, the UE may bundle the ACK information for the received DL data based on the various rules. Thereafter, the UE transmits the bundled ACK information to the BS (S2330).

Herein, ACK information may correspond to HARQ ACK/NACK information for received DL data.

In addition, the bundled ACK information may be transmitted on a PUCCH or a PUSCH depending on situations.

Since each of the examples of the proposed methods can be included as one method for implementing the present disclosure, it is apparent that each example can be regarded as a proposed method. In addition, although the proposed methods can be implemented independently, some of the proposed methods can be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

4. Device Configuration

FIG. 24 is a diagram illustrating the configurations of a UE and a BS for implementing the proposed embodiments. The UE and the BS illustrated in FIG. 24 may operate to implement the embodiments of the ACK information transmission and reception methods therebetween.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above configuration, the UE 1 receives N pieces of DL data (where N is a natural number) through the receiver 20. In this case, one piece of DL data includes M TBs (where M is a natural number), and one TB includes L CBGs (where L is a natural number). Then, the UE 1 bundles ACK information for a total of N*M*L CBGs included in the N pieces of DL data into X-bit ACK information (where X is a natural number more than or equal to 1 and less than N*M*L) through the processor 40 based on a predetermined rule. Thereafter, the UE 1 transmits the bundled X-bit ACK information to the BS 100 through the transmitter 10.

That is, the BS 100 transmits the N pieces of DL data to the UE 1 through the transmitter 110. In this case, as described above, one piece of DL data includes M TBs (where M is a natural number), and one TB includes L CBGs (where L is a natural number). The BS 100 receives the X-bit ACK information (where X is a natural number more than or equal to 1 and less than N*M*L), which is obtained by bundling the ACK information for the total of N*M*L CBGs included in the N pieces of DL data, from the UE 1 through the receiver 120.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 24 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method for transmitting, by a user equipment (UE), acknowledgement information to a base station in a wireless communication system, the method comprising:
   receiving N pieces of downlink data, wherein one piece of downlink data comprises M transmission blocks (TBs) and one TB comprises L code block groups (CBGs);
   bundling acknowledgement information for a total of N*M*L CBGs included in the N pieces of downlink data into X-bit acknowledgement information based on a predetermined rule; and
   transmitting the bundled X-bit acknowledgement information to the base station,
   wherein N is a natural number,
   wherein M is a natural number,
   wherein L is a natural number, and
   wherein X is a natural number more than or equal to 1 and less than N*M*L.

2. The method of claim 1, wherein the predetermined rule corresponds to a first rule where acknowledgement information for all CBGs included in a same TB is bundled, and wherein X corresponds to N*M.

3. The method of claim 1, wherein the predetermined rule corresponds to a second rule where acknowledgement information for all CBGs with a same CBG index for each TB is bundled, and wherein X corresponds to N*L.

4. The method of claim 1, wherein the predetermined rule corresponds to a third rule where acknowledgement information for all CBGs with a same CBG index for each TB and included in TBs with a same TB index for each piece of downlink data is bundled, and wherein X corresponds to M*L.

5. The method of claim 1, wherein the predetermined rule corresponds to a fourth rule where acknowledgement information for all CBGs included in same downlink data is bundled, and wherein X corresponds to N.

6. The method of claim 1, wherein the predetermined rule corresponds to a fifth rule where acknowledgement information for all CBGs included in a same TB is bundled as first acknowledgement information and the first acknowledgement information for all TBs with a same TB index for each piece of downlink data is bundled as second acknowledgement information, and wherein X corresponds to M.

7. The method of claim 1, wherein the predetermined rule corresponds to a sixth rule where acknowledgement information for all CBGs with a same CBG index for all TBs included in the N pieces of downlink data is bundled, and wherein X corresponds to L.

8. The method of claim 1, wherein the predetermined rule corresponds to a seventh rule where the acknowledgement information for the N*M*L CBGs is bundled, and wherein X corresponds to 1.

9. The method of claim 1, wherein the predetermined rule corresponds to an eighth rule where although the acknowledgement information for the N*M*L CBGs is gradually bundled, the bundling is stopped based on that a size of acknowledgement information, bundled until step Y, is less than or equal to a specific bit size,
wherein Y is a natural number.

10. A method for receiving, by a base station, acknowledgement information from a user equipment (UE) in a wireless communication system, the method comprising:
transmitting N pieces of downlink data to the UE, wherein one piece of downlink data comprises M transmission blocks (TBs) and one TB comprises L code block groups (CBGs); and
receiving, from the UE, X-bit acknowledgement information, wherein the X-bit acknowledgement information is obtained by bundling acknowledgement information for a total of N*M*L CBGs included in the N pieces of downlink data based on a predetermined rule,
wherein N is a natural number,
wherein M is a natural number,
wherein L is a natural number, and
wherein X is a natural number more than or equal to 1 and less than N*M*L.

11. A user equipment (UE) for transmitting acknowledgment information to a base station in a wireless communication system, the UE comprising:
a memory; and
at least one processor coupled with the memory,
wherein the at least one processor is configured to:
receive N pieces of downlink data, wherein one piece of downlink data comprises M transmission blocks (TBs) and one TB comprises L code block groups (CBGs);
bundle acknowledgement information for a total of N*M*L CBGs included in the N pieces of downlink data into X-bit acknowledgement information based on a predetermined rule; and
transmit the bundled X-bit acknowledgement information to the base station
wherein N is a natural number,
wherein M is a natural number,
wherein L is a natural number, and
wherein X is a natural number more than or equal to 1 and less than N*M*L.

12. A base station for receiving acknowledgement information from a user equipment (UE) in a wireless communication system, the base station comprising:
a memory; and
at least one processor coupled with the memory,
wherein the at least one processor is configured to:
transmit N pieces of downlink data to the UE, wherein one piece of downlink data comprises M transmission blocks (TBs) and one TB comprises L code block groups (CBGs); and
receive, from the UE, X-bit acknowledgement information, wherein the X-bit acknowledgement information is obtained by bundling acknowledgement information for a total of N*M*L CBGs included in the N pieces of downlink data based on a predetermined rule,
wherein N is a natural number,
wherein M is a natural number,
wherein L is a natural number, and
wherein X is a natural number more than or equal to 1 and less than N*M*L.

* * * * *